United States Patent
Kim et al.

(10) Patent No.: US 9,602,641 B2
(45) Date of Patent: Mar. 21, 2017

(54) WATCH TYPE MOBILE TERMINAL

(71) Applicant: LG ELECTRONICS INC., Seoul (KR)

(72) Inventors: Taeseong Kim, Seoul (KR); Gukchan Lim, Seoul (KR); Yujune Jang, Seoul (KR); Jeongyoon Rhee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/726,203

(22) Filed: May 29, 2015

(65) Prior Publication Data
US 2015/0358438 A1     Dec. 10, 2015

(30) Foreign Application Priority Data

Jun. 5, 2014   (KR) .................. 10-2014-0068521

(51) Int. Cl.
| | |
|---|---|
| H04B 1/38 | (2015.01) |
| H04M 1/02 | (2006.01) |
| H04B 1/3827 | (2015.01) |
| H04W 4/00 | (2009.01) |
| H04M 1/11 | (2006.01) |
| G04G 21/02 | (2010.01) |
| H04W 88/02 | (2009.01) |

(52) U.S. Cl.
CPC ......... H04M 1/026 (2013.01); G04G 21/025 (2013.01); H04B 1/3827 (2013.01); H04M 1/11 (2013.01); H04W 4/005 (2013.01); *H04B 2001/3861* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 5,734,625 A | * | 3/1998 | Kondo ............... | A61B 5/02438 368/10 |
| 2006/0253010 A1 | | 11/2006 | Brady et al. | |
| 2014/0007682 A1 | * | 1/2014 | Kabasawa ............ | G01C 19/56 73/504.12 |

FOREIGN PATENT DOCUMENTS

| | | |
|---|---|---|
| JP | 2013-31534 | 2/2013 |
| KR | 10-0650190 | 11/2006 |
| WO | 2013/148753 | 10/2013 |

OTHER PUBLICATIONS

European Patent Office Application Serial No. 15001622.8, Search Report dated May 2, 2016, 7 pages.

* cited by examiner

*Primary Examiner* — Adolf Dsouza
(74) *Attorney, Agent, or Firm* — Lee Hong Degerman Kang & Waimey

(57) ABSTRACT

A watch type mobile terminal which is worn on a wrist includes: a main body having a display unit; a band unit connected to the main body such that the mobile terminal is worn on the wrist, and surround the wrist; a sensor unit installed in a region of the main body, having a light emitting unit and a light receiving unit, and configured to collect biometric information; a deformation unit formed in a region of the band unit facing the wrist, and provided to be deformed in shape; and a control unit configured to control the deformation unit to be deformed based on activation of the sensor unit.

19 Claims, 26 Drawing Sheets

(a)

(a)

WATCH TYPE MOBILE TERMINAL

CROSS-REFERENCE TO RELATED APPLICATION

Pursuant to 35 U.S.C. §119(a), this application claims the benefit of earlier filing date and right of priority to Korean Application No. 10-2014-0068521, filed on Jun. 5, 2014, the contents of which are incorporated by reference herein in its entirety.

BACKGROUND OF THE INVENTION

1. Field of the Invention

The present disclosure relates to a watch type mobile terminal wearable on the user's wrist.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, wearable devices devised to be wearable on a part of a user's body to provide and collect information while the user is out of awareness have been developed. In particular, in the case of a watch type mobile terminal which is worn on a user's wrist minimizes inconvenience in user's daily life.

Research has been conducted to collect and use biometric information of a user using a watch type mobile terminal in continuous contact with a body. However, when measuring biometric information, measurement quality is degraded by noise due to a user's motion.

SUMMARY OF THE INVENTION

Therefore, an aspect of the detailed description is to effectively collect biometric information by means of a sensor unit provided in a watch type mobile terminal worn on a body.

To achieve these and other advantages and in accordance with the purpose of this specification, as embodied and broadly described herein, a watch type mobile terminal which may be worn on a wrist may include: a main body having a display unit; a band unit connected to the main body such that the mobile terminal is worn on the wrist, and surround the wrist; a sensor unit installed in a region of the main body, having a light emitting unit and a light receiving unit, and configured to collect biometric information; a deformation unit formed in a region of the band unit facing the wrist, and provided to be deformed in shape; and a control unit configured to control the deformation unit to be deformed based on activation of the sensor unit.

According to an exemplary embodiment of the present disclosure, the deformation unit may be formed in a region adjacent to the sensor unit, and the watch type mobile terminal may be expanded to block ambient light made incident to the sensor unit from the outside based on the activation of the sensor unit.

According to an exemplary embodiment of the present disclosure, the deformation unit may include a plurality of deformation members formed to surround the sensor unit, and the control unit may deform a shape of at least one of the plurality of deformation members based on an amount of light received by the light receiving unit.

According to an exemplary embodiment of the present disclosure, the deformation unit may include a plurality of deformation members disposed with the sensor unit interposed therebetween, and the plurality of deformation members may be deformed to have different sizes such that light emitted from the light emitting unit reaches a preset position of the wrist.

According to an exemplary embodiment of the present disclosure, the watch type mobile terminal may further include: a memory configured to store a region at which light emitted from the light emitting unit when the sensor unit is activated arrives, as measurement region information.

According to an exemplary embodiment of the present disclosure, the plurality of deformation members may be arranged along the band unit, and when the sensor unit moves based on the stored measurement region information, the control unit may sequentially deform the plurality of deformation members to move the sensor unit on the wrist.

According to an exemplary embodiment of the present disclosure, the watch type mobile terminal may further include: a sensing unit configured to sense a movement of the sensor unit based on the wrist in a state in which the sensor unit is activated.

According to an exemplary embodiment of the present disclosure, the watch type mobile terminal may further include: an alarm output unit configured to output alarm information when a movement of the sensor unit is sensed by the sensing unit.

According to an exemplary embodiment of the present disclosure, the alarm information may correspond to vibration, the alarm output unit may include a haptic module formed along the band unit, and the control unit may control the haptic module to output vibration to a position adjacent to a measurement region based on the measurement region information.

According to an exemplary embodiment of the present disclosure, the control unit may control the haptic module to increase strength of vibration as the sensor unit becomes closer to the measurement region based on the measurement region information.

According to an exemplary embodiment of the present disclosure, the alarm information may correspond to hearing signal, and the alarm output unit may include an audio output unit configured to output different hearing signals according to degrees over which the sensor unit has moved.

According to an exemplary embodiment of the present disclosure, when a movement of the sensor unit is sensed by the sensing unit, the control unit may deactivate the sensor unit.

According to an exemplary embodiment of the present disclosure, in a state in which the band unit forms a closed loop and is fixed to the wrist, the control unit may expand the deformation unit in size such that the sensor unit is tightly attached to the wrist.

According to an exemplary embodiment of the present disclosure, the band unit may include a first band connected to one end of the main body, a second band connected to the other end of the main body, and a fastener connecting the first and second bands, the sensor unit may be disposed to be adjacent to the main body, and the deformation unit may be disposed in a region adjacent to the fastener.

According to an exemplary embodiment of the present disclosure, the deformation unit may be formed in at least one region of the band unit, and the control unit may control the deformation unit to be bent such that the sensor unit is tightly attached to the wrist.

According to an exemplary embodiment of the present disclosure, when the sensor unit fails to collect biometric information, the control unit may deform the deformation unit.

According to an exemplary embodiment of the present disclosure, when the sensor unit fails to collect biometric information, the control unit may control the display unit to output guide information for guiding a movement of the sensor unit.

According to an exemplary embodiment of the present disclosure, when the sensor unit is activated, the control unit may control the display unit to output notification information indicating an activated state of the sensor unit.

According to an exemplary embodiment of the present disclosure, the guide information may include an image indicating a movement direction of the main body or the band.

According to an exemplary embodiment of the present disclosure, the band unit may include a first band connected to one end of the main body, a second band connected to the other end of the main body, and a fastener connecting the first and second bands, wherein the watch type mobile terminal may further include: a haptic module disposed to be adjacent to the fastener and configured to generate vibration when the sensor unit fails to collect biometric information.

Effects of the mobile terminal and the control method thereof according to exemplary embodiments of the present disclosure are as follows.

According to at least one of the exemplary embodiments of the present disclosure, since ambient light introduced to a light receiving unit is blocked by the deformation unit deformed in shape according to a control command and leakage of light emitted from the light emitting unit is prevented, biometric information collecting quality can be enhanced.

In addition, since the sensor unit moves to a more accurate position corresponding to the measurement region of a user's wrist according to deformation of the deformation unit, user's adjustment is not required and more accurate biometric information can be collected.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
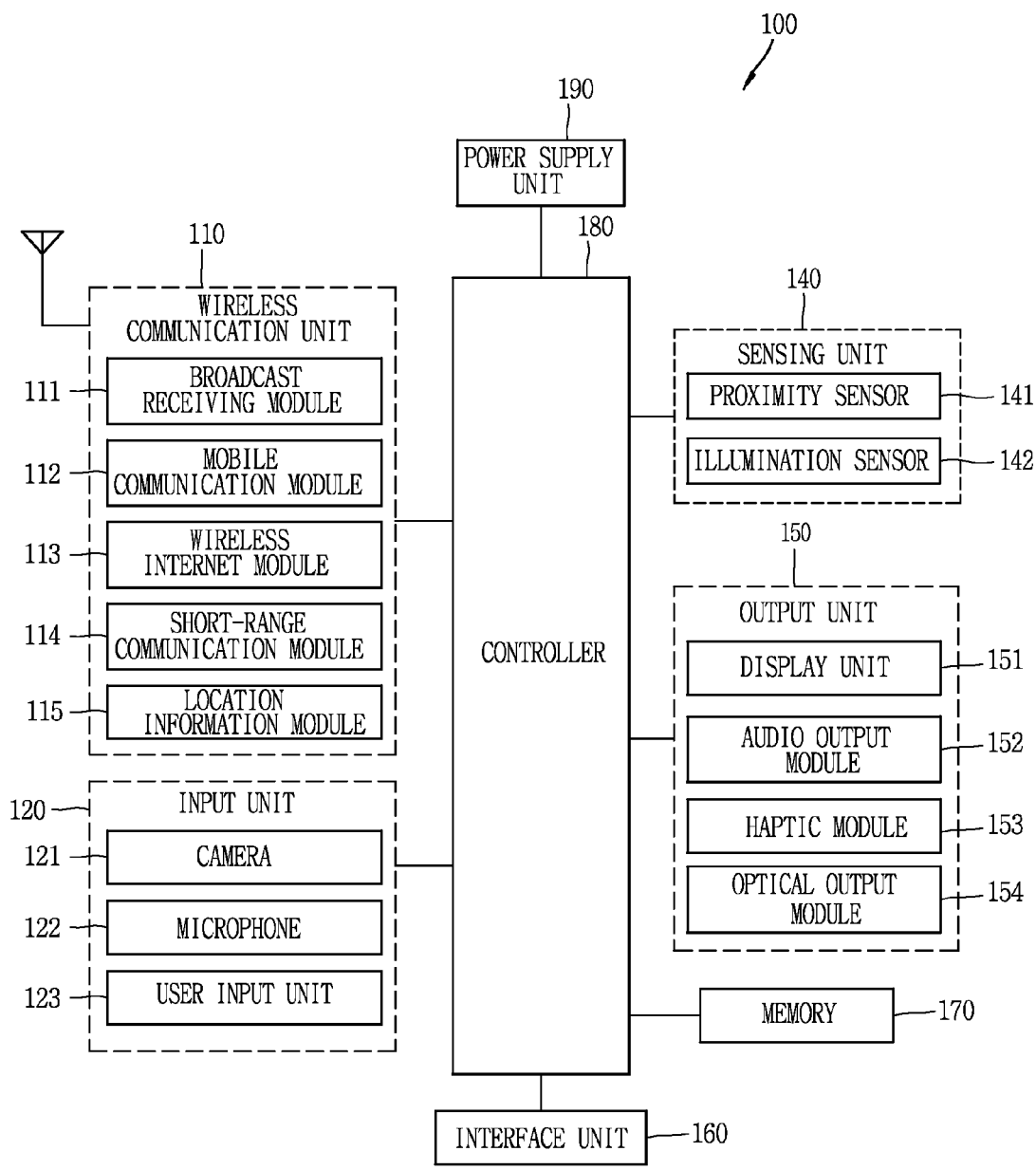
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
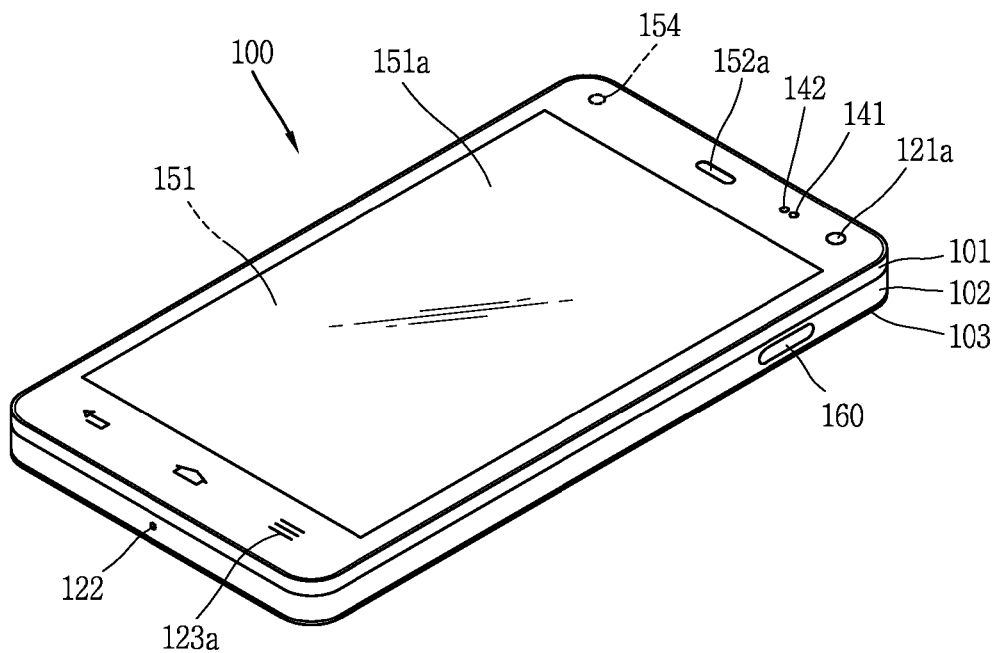
FIGS. 1B and 1C are conceptual views of one example of the mobile terminal, viewed from different directions.
Figure 1C:
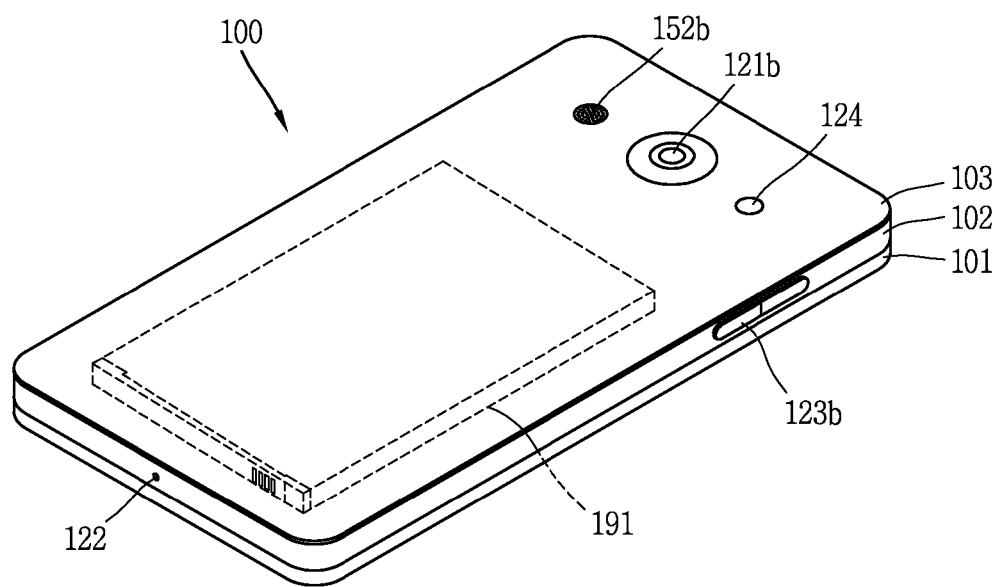

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output unit 152, a haptic module 153, and a light output unit 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 160.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output unit 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output unit 152 can provide audible output related to a particular function (e.g., a call signal reception sound, a message reception sound, etc.) performed by the mobile terminal 100. The audio output unit 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

A light output unit 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the light output unit 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output unit 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, first and second audio output units 152a and 152b, the proximity sensor 141, an illumination sensor 142, a light output unit 154, first and second cameras 121a and 121b, first and second manipulation units 123a and 123b, a microphone 122, an interface unit 160, and the like.

Hereinafter, as illustrated in FIGS. 1B and 1C, the mobile terminal 100 in which the display unit 151, the first audio output unit 152a, the proximity sensor 141, the illumination sensor 142, the light output unit 154, the first camera 121a, and the first manipulation unit 123a are disposed on a front surface of the terminal body, the second manipulation unit 123b, the microphone 122, and the interface unit 160 are disposed on the side of the terminal body, and the second audio output unit 152b and the second camera 121b are disposed on a rear surface of the terminal body will be described as an example.

However, the components are not limited to the configuration. The components may be excluded, replaced, or disposed on other surfaces as needed. For example, the first manipulation unit 123a may not be provided on the front surface of the terminal body, and the second audio output unit 152b may be provided on the side of the terminal body, rather than on the rear surface of the terminal body.

The display unit 151 may display (or output) information processed in the mobile terminal 100. For example, the display unit 151 may display executed screen information of an application program driven in the mobile terminal 100, or user interface (UI) information or graphic user interface (GUI) information according to the executed screen information.

The display unit 151 may include a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver and the second audio output unit 152b may be implemented in the form of a loud speaker to output voice audio, alarm sounds, multimedia audio reproduction, and the like.

The window 151a of the display unit 151 will typically include an aperture to permit audio generated by the first audio output unit 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The light output unit 154 can be configured to output light for indicating an event generation. Examples of such events include a message reception, a call signal reception, a missed call, an alarm, a schedule notice, an email reception, information reception through an application, and the like. When a user has checked a generated event, the control unit can control the light output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output units 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output units 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. However, the present disclosure is not limited thereto and a position of the rear input unit may be modified.

When the rear input unit is provided on the rear surface of the terminal body, a new user interface may be implemented. Also, when the touch screen or the rear input unit as described above replaces at least some functions of the first manipulation unit 123a provided on the front surface of the terminal body so the first manipulation unit 123a is omitted from the front surface of the terminal body, the display unit 151 can have a larger screen.

As a further alternative, the mobile terminal 100 may include a finger scan sensor which scans a user's fingerprint. The control unit 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output unit 152b can be located on the terminal body. The second audio output unit 152b may implement stereophonic sound functions in conjunction with the first audio output unit 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the control unit 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3A:
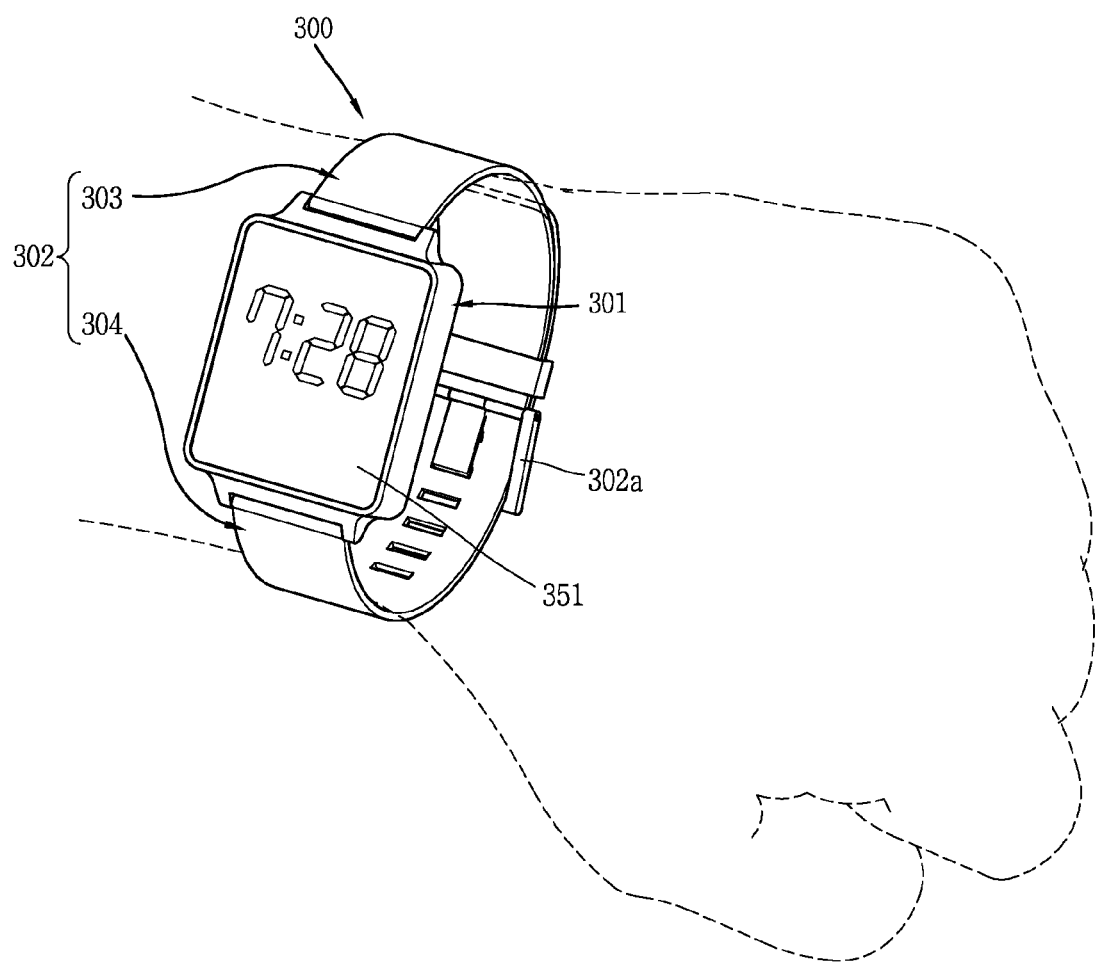
FIGS. 3A, 3B, and 3C are perspective and plan views illustrating an example of a watch type mobile terminal related to another exemplary embodiment of the present disclosure.
Figure 3B:
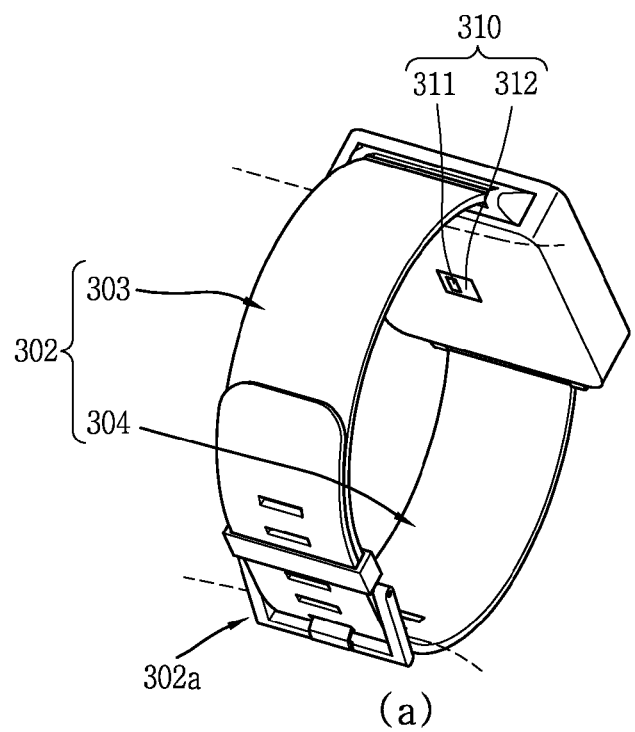
Figure 3C:
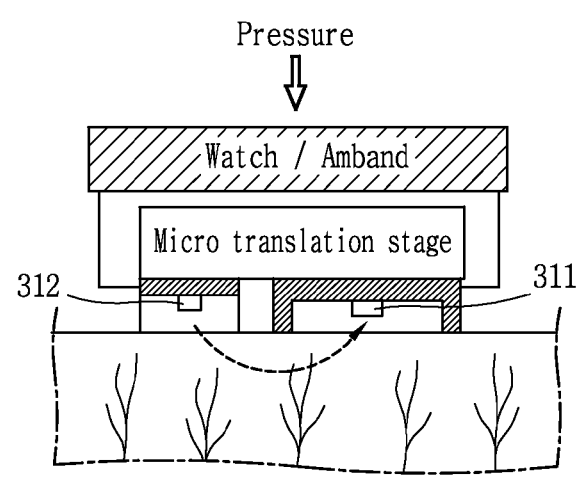

FIGS. 3A, 3B, and 3C are perspective and plan views illustrating an example of a watch type mobile terminal 300 related to another exemplary embodiment of the present disclosure.

Referring to FIGS. 3A through 3C, the watch type mobile terminal 300 includes a main body 301 including a display unit 351 and a band 302 connected to the main body 301 so as to be wearable on a user's wrist. In general, the mobile terminal 300 may have features identical or similar to the mobile terminal 100 of FIGS. 1A through 1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type external device 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output unit 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on a user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Hereinafter, exemplary embodiments related to a control method that may be implemented in the mobile terminal configured as described above will be described with reference to the accompanying drawings. It will be apparent to those skilled in the art that modifications and variations can be made without departing from the spirit and scope of the invention.

Figure 2:
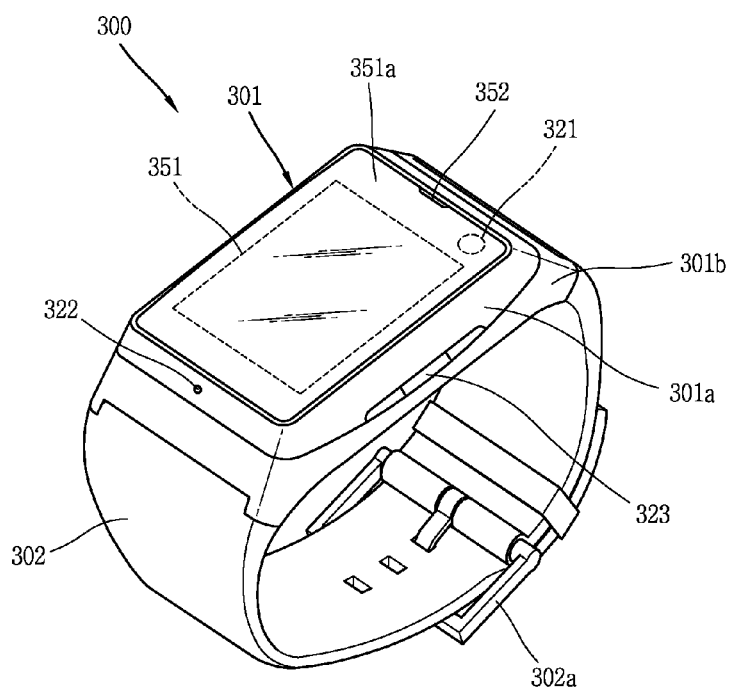
FIG. 2 is a conceptual view of a mobile terminal viewed in one direction.

FIG. 3A is a conceptual view of a watch type mobile terminal of FIG. 2 illustrating a band region according to an exemplary embodiment of the present disclosure, and FIG. 3B is a conceptual view of the watch type mobile terminal illustrating a sensor unit.

Referring to FIGS. 3A and 3B, a band unit 302 of the mobile terminal 300 includes a first band 303 and a second band 304 connected to both sides of the main body 301. For example, the first band 303 is connected to one end (upper end) of the main body 301, and the second band 304 is connected to the other end (lower end) of the main body 301, and the first band 301 and the second band 304 are fastened by the fastener 302a so as to be wearable on a user's wrist. When the watch type mobile terminal is not worn on a wrist, the first and second bands 303 and 304 may be separated.

The watch type mobile terminal 300 according to an exemplary embodiment of the present disclosure includes a sensor unit 310 collecting biometric information of the user. For example, the biometric information may correspond to a change in a blow flow rate. However, the present disclosure is not limited thereto and the biometric information may be electrocardiogram (ECG) recognizing an electrical signal of the heartbeat, or the like.

FIG. 3C is a conceptual view illustrating a principle of the sensor unit 310. The sensor unit includes a light receiving unit 311 and a light emitting unit 312. The light emitting unit may be implemented as a light emitting diode (LED). Light emitted by the light emitting unit 312 transmits through a user's skin and is reflected to be made incident to the light receiving unit 311. Based on an amount of and a change in light made incident to the light receiving unit 311, biometric information corresponding to a blood flow rate may be collected. In detail, light emitted by the light emitting unit 312 may pass through a subcutaneous tissue to reach the artery and the vein, and an amount of reflected light may be varied depending on an absorption rate within the skin. Accordingly, while the user wears the watch type mobile terminal 300, light is emitted and received, thus collecting biometric information of the user.

There is no limitation in the number of the light receiving unit 31 and the light emitting unit 312. The sensor unit 310 may be formed in a region in close proximity to the user's skin. For example, the sensor unit 310 may be formed on a region of the opposite side of the main body 301 on which the display unit 351 is formed. However, the present disclosure is not limited thereto and the sensor unit 310 may be installed in the band unit 302 or the fastener 302a.

The watch type mobile terminal 300 according to an exemplary embodiment of the present disclosure may further include a deformation structure deformed to effectively collect biometric information by the sensor unit 310. Hereinafter, the deformation structure will be described in detail.

Figure 4A:
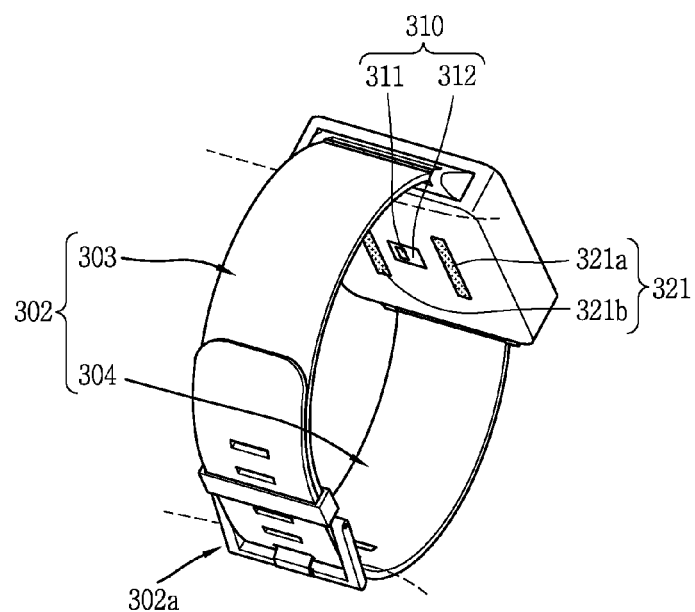
FIGS. 4A(a), 4A(b), 4B(a), 4B(b), 4B(c), 4C(a), 4C(b) and 4C(c) are conceptual views illustrating a deformation unit installed in a terminal body.
Figure 4A:
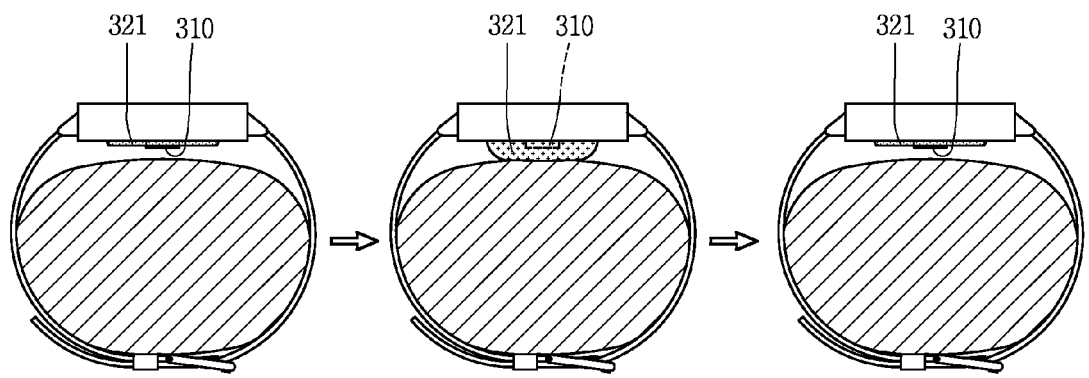

FIGS. 4A(a) through 4C(c) are conceptual views illustrating a deformation unit installed in a terminal body.

The deformation unit for blocking an introduction of ambient light will be described with reference to FIG. 4A. Referring to FIG. 4A(a), a sensor unit 310 is formed on one surface of the main body 301. When the watch type mobile terminal 300 is worn on a user's wrist, the sensor unit 310 provides light to the wrist and receives light reflected through the skin of the wrist. The sensor unit 310 may be formed in a central region of one surface of the main body 301.

The deformation unit 321 includes first and second deformation members 321a and 321b, and is disposed on one surface of the main body 301. The first and second deformation members 321a and 321b may be disposed to be spaced apart from one another with the sensor unit 310 interposed therebetween. For example, when the main body 301 has a quadrangular shape having four sides on one surface, the first and second bands 303 and 304 may be connected to two facing sides (or edges), and the first and second deformation members 321a and 321b may be formed to be adjacent to the other remaining two sides (or edges). Also, the first and second deformation members 321a and 321b may be formed to extend substantially in parallel with the two remaining sides.

Referring to FIG. 4A(b), the first and second deformation members 321a and 321 b may be deformed based on a driving state of the sensor unit 310. For example, when the sensor unit 310 is activated, the first and second deformation members 321a and 321b may be deformed to be thick.

For example, the first and second deformation members 321a and 321b may be formed of an electroactive polymer (EAP) material. The EAP material is a material which changes in shape according to an external electric field. The EAP may be, for example, an inherently conductive polymer (ICPS), an inherently dissipative polymer (IDPS) using a dissipative structure, an electroconductive plastics, an ionic polymer gel, an ionic polymer/metal composite (IPMC), a conductive polymer containing carbon nanoparticles, and the like.

The EAP may be formed of a gel type EAP or a film type EAP. Materials to be used for forming a film type EAP may include at least one of carbon fiber reinforced plastic, fine ceramics, and crystallized glass. The carbon fiber reinforced plastic may be plastic reinforced by including carbon fiber so as to be formed as a material which has high strength and is light, and fine ceramics (or new ceramics) may be a ceramic material obtained by sintering a nitride carbide, i.e., a natural inorganic compound or an artificial inorganic compound, as a raw material. Also, crystallized glass, also called glass ceramics, refers to glass having characteristics which was absent in the past, by technically crystallizing glass having amorphous structure.

In a state in which the sensor unit 310 is not activated, the deformation unit 321 is maintained in the thinnest state. Although not shown in the drawing, in a case in which a region of the sensor unit 310 protrudes from the main body 301 by a preset thickness, the deformation unit 321 may also be formed to protrude from the main body 301 by the preset thickness.

The control unit 180 may generate a control command to deform the deformation unit 321 based on activation of the sensor unit 310. When the sensor unit 310 is activated and light starts to be emitted from the light emitting unit 312, when an amount of light transmitted to the light receiving unit 311 is determined to be smaller than a preset reference amount of light, or when light transmitted to the light receiving unit 311 is made incident in an unstable state, the control unit 180 may control the deformation unit 321 to expand. In this case, the control unit 180 may control the deformation unit 321 to become thicker.

For example, when a closed loop formed by the first and second bands 303 and 304 and the fastener 302a is fixed to be greater than the circumference of the user's wrist so the sensor unit 310 is not tightly attached to the skin of the user's wrist, the control unit 180 may control the deformation unit 321 to become thicker. When the sensor unit 310 is not tightly attached to the user's wrist, emitted light may be leaked or ambient light introduced from the outside may be made incident to make unstable an amount of light collected from the light receiving unit 311.

The first and second deformation members 321a and 321b having an increased thickness may be tightly attached to the skin of the user's wrist. Since a path along which ambient light is introduced is blocked by the first and second deformation members 321a and 321b, noise due to ambient light can be prevented.

Until when the first and second deformation members 321a and 321b are tightly attached to the skin, or until when light is collected in a stable state by the light receiving unit 311, the control unit 180 may expand the first and second deformation members 321a and 321b.

Meanwhile, when the sensor unit 310 is switched to a deactivated state, the control unit 180 reduces the deformation unit 321.

According to the present exemplary embodiment, since a path along which ambient light is introduced or light emitted from the light emitting unit 312 is leaked is blocked by the deformation unit 321, light reflected from the skin can be more accurately measured. Thus, in a case in which the watch type mobile terminal is loosely worn on the user's wrist, the deformation unit 321 is deformed in thickness while the sensor unit 310 is being activated, and thus, accurate biometric information can be collected, without being affected by the wearing state.

Figure 4B:
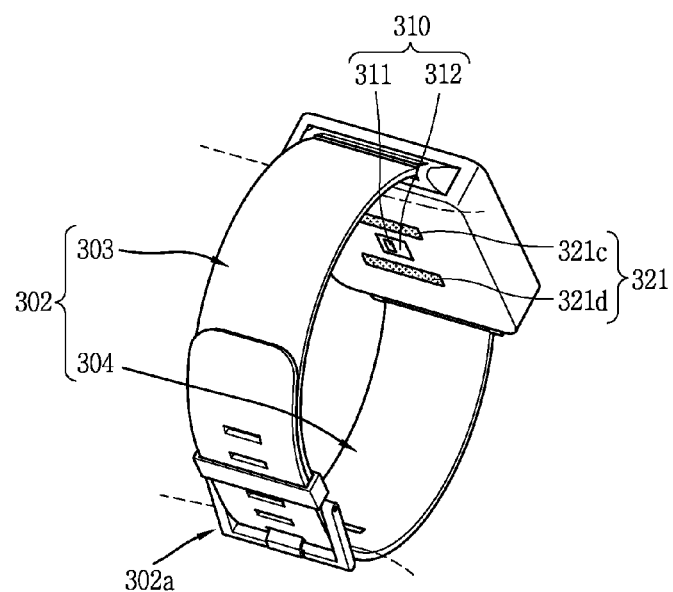
Figure 4B:
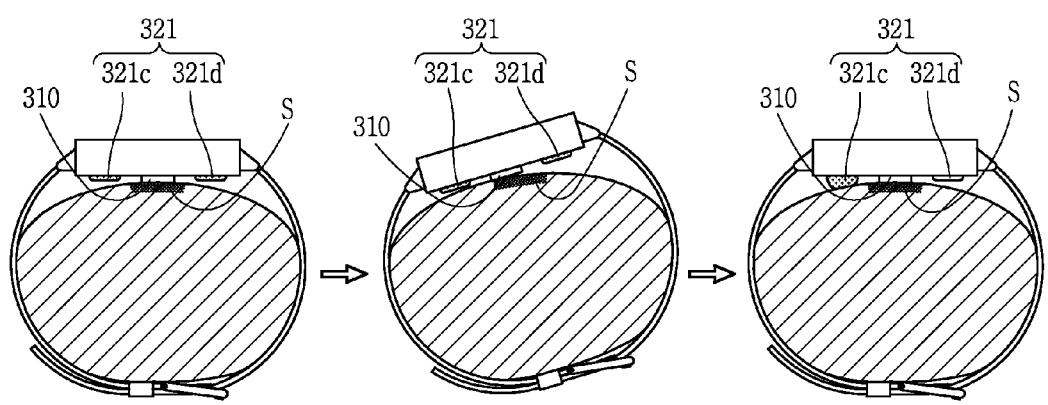
Figure 4B:
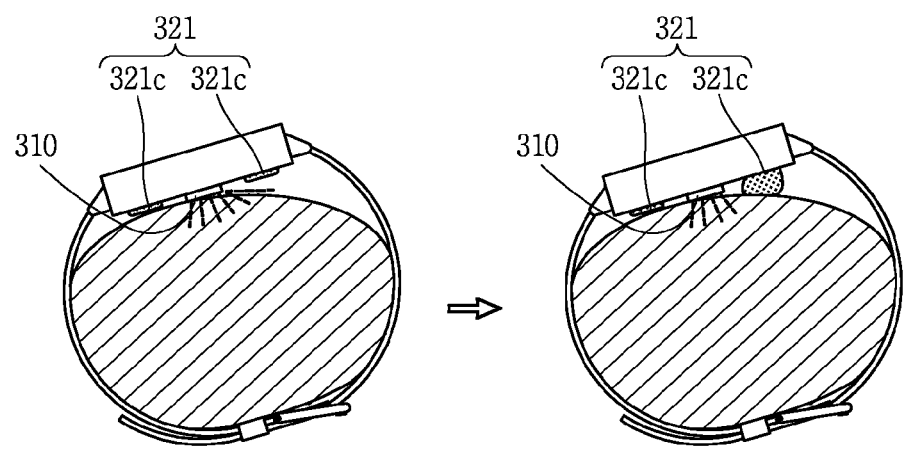

A control method of a deformation unit having a different disposition structure will be described with reference to FIG. 4B. Referring to FIG. 4B(a), a deformation unit 321 includes third and fourth deformation members 321c and 321d. The third and fourth deformation members 321c and 321d are disposed to be spaced apart from one another with the sensor unit 310 interposed therebetween. The third and fourth deformation members 321c and 321d may be formed to be adjacent to the edges of the main body 301 to which the first and second bands 303 and 304 are connected, and may be formed to extend substantially in parallel with the edges. However, the configuration of the third and fourth deformation members 321c and 321d is not limited thereto.

A state in which the watch type mobile terminal is worn such that the sensor unit 310 deviates from a measurement region S of the user's wrist will be described with reference to FIG. 4B(b). The present exemplary embodiment includes a state in which the sensor unit 310 is activated or a state in which the sensor unit 310 is activated to collect biometric information. A position of the user's wrist where measurement can be effectively made may be designated according to types of biometric information desired to be measured by the sensor unit 310. For example, the position of the user's wrist where measurement can be effectively made may be a particular region of the user's wrist where a change in a blood flow rate can be sensed as best as possible. Namely, when the measurement region of the sensor unit 310 deviates from the designated measurement region S, the control unit 180 controls the deformation unit 321 to be formed before the sensor unit 310 is activated or while the sensor unit 310 is being activated.

In FIG. 4B(b), when the watch type mobile terminal 300 moves on the user's wrist such that the sensor unit 310 does not correspond to the measurement region S, the control unit 180 expands the third deformation member 321c. The entirety of the watch type mobile terminal 300 may rotate on the user's wrist by the third deformation member 321c. Through the rotation, the sensor unit 3100 may be disposed in a position corresponding to the measurement region S.

According to the present exemplary embodiment, the watch type mobile terminal 300 may automatically be changed to an optimal state without having to move the mobile terminal to fit the measurement region S by the user. Also, fine adjustment is allowed for measurement, collecting more accurate biometric information.

A control method of a deformation unit according to another exemplary embodiment of the present disclosure will be described with reference to FIG. 4B(c). In a case in which the sensor unit 310 is not disposed in a position corresponding to the measurement region S, light emitted from the light emitting unit 312 may not be transmitted to the measurement region S or may be leaked to outside.

In this case, the control unit 180 expands the fourth deformation member 321d. For example, the fourth deformation member 321d may block a path through which light may be leaked, and expanded to cover a skin area including the measurement region S.

Accordingly, light leakage can be prevented and light may be transmitted only to the measurement region S, and thus, an accurate amount of light can be emitted and received.

A watch type mobile terminal including a plurality of light receiving units will be described with reference to FIG. 4C.

Figure 4C:
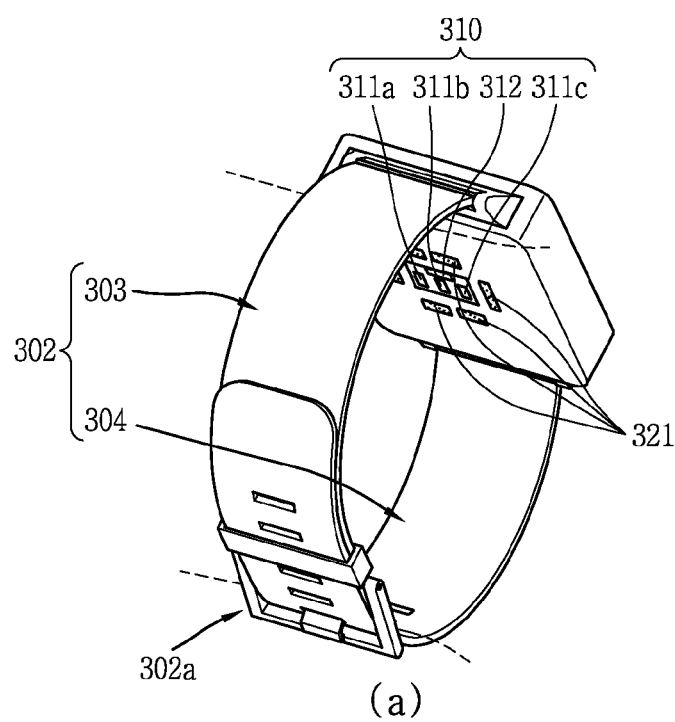
Figure 4C:
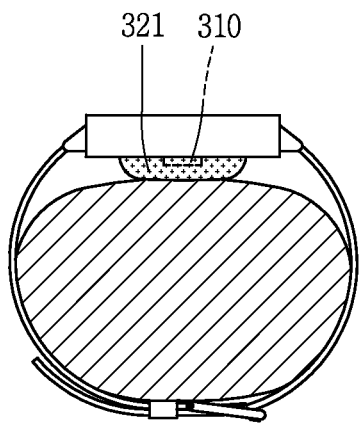
Figure 4C:
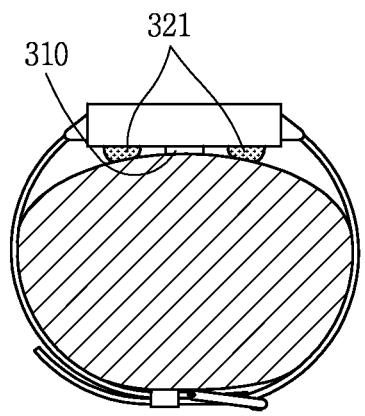

Referring to FIG. 4C(a), the sensor unit 310 includes a light emitting unit 312 and first to third light receiving units 311a, 311b, and 311c. When light emitted from the light emitting unit 312 is reflected from different regions, the first to third light receiving units 311a, 311b, and 311c receive the reflected light. The first to third light receiving units 311a, 311b, and 311c may be formed to be spaced from one another. Also, the first to third light receiving units 311a, 311b, and 311c may be independently driven. For example, only a portion of the first to third light receiving units 311a, 311b, and 311c may be driven.

The deformation unit 321 includes a plurality of deformation members. For example, the deformation unit 321 may include six differentiated deformation members, and the six deformation members may be independently deformed. The six deformation members may be disposed on one surface of the main body 301 such that the six deformation members surround the first to third light receiving units 311a, 311b, and 311c.

Referring to FIG. 4C(b) and FIG. 4C(c), based on a driving state of the first to third light receiving units 311a, 311b, and 311c, the control unit 180 may control a portion of the plurality of deformation members to be expanded.

For example, based on an amount of light emitted from the light emitting unit 311, the control unit 180 may sense an amount of light received by the first to third light receiving units 311a, 311b, and 311c, and expand a portion of deformation members adjacent to a light receiving unit determined to have received an excessively small or large amount of light.

Alternatively, when the third light receiving unit 311c disposed to be adjacent to the edge of the main body 301 is activated, a portion of the deformation members is expanded to block ambient light, and when the second light receiving unit 311b disposed in a relatively central region is activated, a portion of the deformation members surrounding the second light receiving unit 311b may be deformed so as to be disposed to accurately correspond to the measurement region S.

Accordingly, the plurality of deformation members may be independently deformed based on a driving state of the plurality of light receiving units.

Figure 5A:
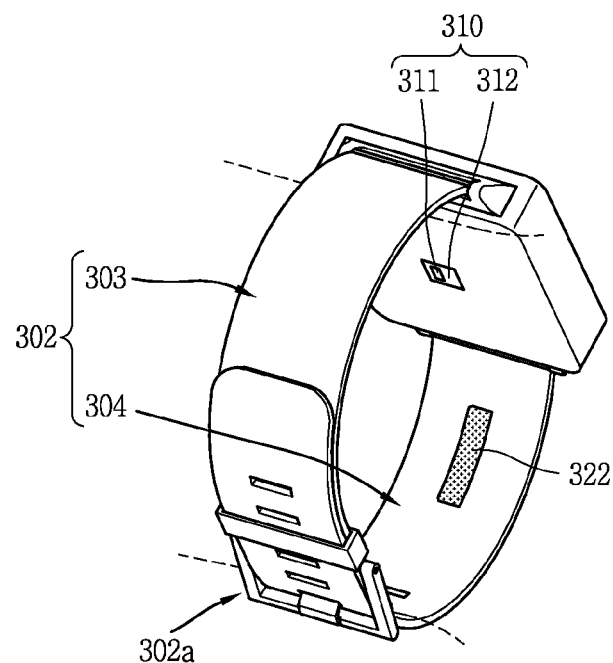
FIGS. 5A(a), 5A(b), 5B, 5C and 5D are conceptual views illustrating a deformation unit formed in a band unit.
Figure 5A:
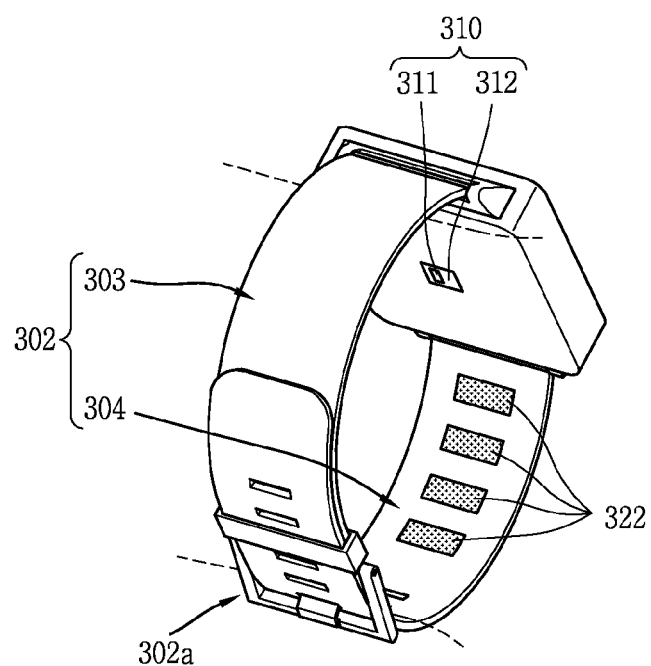

FIGS. 5A(a) through 5D are conceptual views illustrating a deformation unit formed in a band unit.

Referring to FIG. 5A(a), deformation unit 322 are formed on one surface of the first and second bands 303 and 304 facing the user's wrist. The deformation unit 322 may be formed only on any one of the first and second bands 303 and 304. The deformation unit 322 may have a bar shape in a direction in which the first band 303 extends.

Referring to FIG. 5A(b), the deformation unit 322 may include a plurality of deformation members may be formed to arranged in a direction in which the bands extend. The plurality of deformation members 322 may be independently controlled and thus the plurality of deformation members 322 may be controlled to have different shapes. The deformation units 322 illustrated in FIG. 5A(a) and FIG. 5A(b) may be formed of an EPA material.

In a case in which the band unit 302 is formed of a deformable material, the deformation unit 322 may be formed within the band portion 302.

Figure 5B:
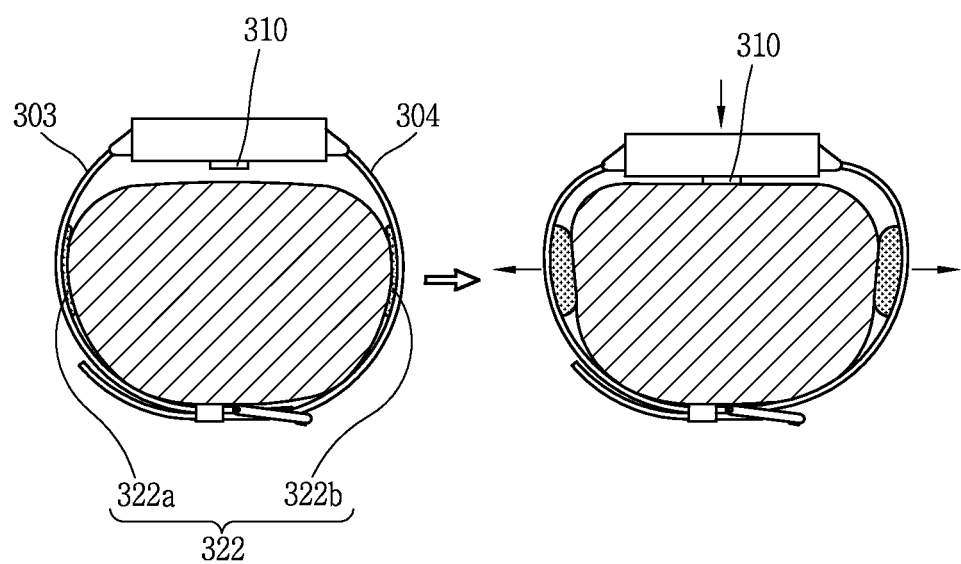

A control method of a deformation unit according to an exemplary embodiment of the present disclosure will be described with reference to FIG. 5B. The deformation unit 322 includes first and second deformation members 322a and 322b disposed in the first and second bands 303 and 304, respectively.

In a state in which the watch type mobile terminal 300 is worn on a user's wrist, the control unit 180 may generate a control command for deforming the deformation unit 322. For example, when the sensor unit 310 is activated, when an amount of light received by the light receiving unit 311 is less than a reference value, or when it is determined that a received light is unstable, the control unit 180 may generate the control command.

The control unit 180 may control the first and second deformation members 322a and 322b to be expanded in size (or thickness). When the first and second deformation members 322a and 322b are expanded, a space between the band unit 302 and the user's wrist may be increased and the sensor unit 310 may be tightly attached to the user's wrist. Only any one of the first and second deformation members 322a and 322b may be controlled to be expanded.

Figure 5C:
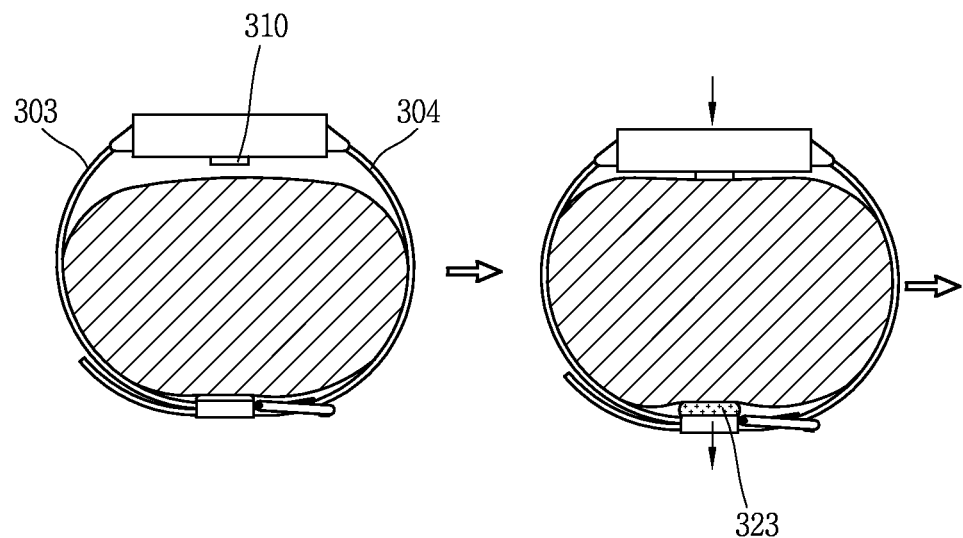

Referring to FIG. 5C, a deformation unit 323 according to an exemplary embodiment of the present disclosure may be formed to overlap the fastener 302a. for example, the deformation unit 323 may be directly formed on one surface of the fastener 302a or may be formed in a region of the band region 302 overlapping the fastener 302a in a state in which the watch type mobile terminal 300 is worn on the user's wrist. In this case, the deformation unit 323 may be formed in a region facing the main body 301 based on the user's wrist.

Figure 5D:
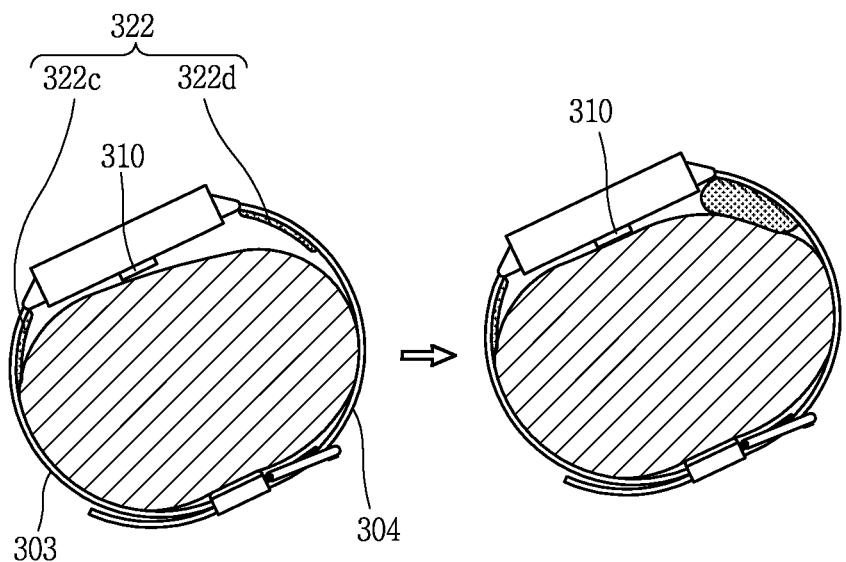

Referring to FIG. 5D, the deformation unit 322 includes third and fourth deformation members 322c and 322d. A control method of the deformation unit 322 when a portion of the main body 301 is separated from the user's wrist so light emitted from the sensor unit 310 fails to reach a designated region of the user's wrist in an exemplary embodiment will be described.

The control unit 322d expands the fourth deformation member 322d in close proximity to one region of the main body 301 separated from the user's wrist. When the fourth deformation member 322d expands, the second band 304 is pulled, the one region of the main body 301 is positioned to be adjacent to the user's wrist, and the sensor unit 310 is tightly attached to the user's wrist.

Based on the control command, the control unit 180 may expand at least a portion of the deformation unit 322, and accordingly, the main body 301 and the sensor unit 310 are tightly attached to the user's wrist.

Accordingly, the user does not need to adjust the fastener 302a to make the sensor unit 310 tightly attached to the user's wrist. The user may loosely wear the watch type mobile terminal normally, and may tightly attach the watch type mobile terminal only when the sensor unit 310 operates.

When the sensor unit 310 is tightly attached to the user's wrist, an introduction of ambient light can be blocked and leakage of light emitted from the light emitting unit 312 or light reflected through the skin can be prevented. Also, while the sensor unit 310 collects biometric information, a movement can be minimized, reducing an error.

Figure 6:
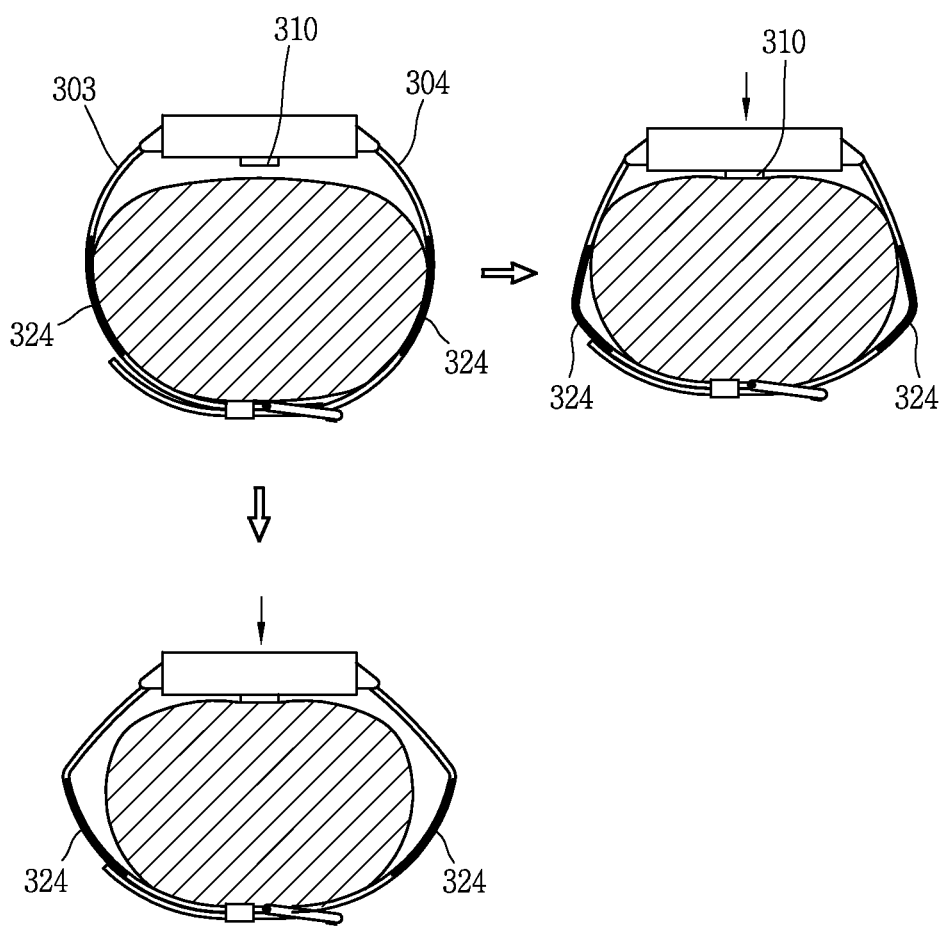
FIG. 6 is a conceptual view illustrating a watch type mobile terminal including a deformation unit according to another exemplary embodiment of the present disclosure.

FIG. 6 is a conceptual view illustrating a watch type mobile terminal including a deformation unit according to another exemplary embodiment of the present disclosure. A deformation unit 343 according to the present exemplary embodiment is formed in the first and second bands 303 and 304, and is formed as a piezoelectric element extending along the band unit 302. The piezoelectric element is an element deformed in shape based on an amount of voltage applied thereto. Also, the piezoelectric element may have properties that it is bent in different directions according to directions of applied voltages.

When the bend unit 302 is worn on the user's wrist, the deformation unit 324 is formed to be bent according to the shape of the user's wrist and further bent or spread by the voltage.

Based on a control command for deforming the deformation unit 324, the control unit 180 may apply a voltage to the deformation unit 324. For example, the deformation unit 324 may be bent in a direction away from the user's wrist based on the voltage. In this case, a space is formed between the first and second bands 303 and 304 and the user's wrist and the sensor unit 310 is tightly attached to the user's wrist.

Conversely, the deformation unit 324 may be spread to be flat based on the voltage. In this case, when a space is formed between the first and second bands 303 and 304 and the user's wrist, the sensor unit 310 is tightly attached to the user's wrist.

Accordingly, quality of collecting biometric information by the sensor unit 310 may be enhanced. Also, in the case in which the deformation unit 324 is formed as a piezoelectric element, the deformation unit 324 may be formed within the band unit 302, implementing a simpler appearance.

Figure 7A:
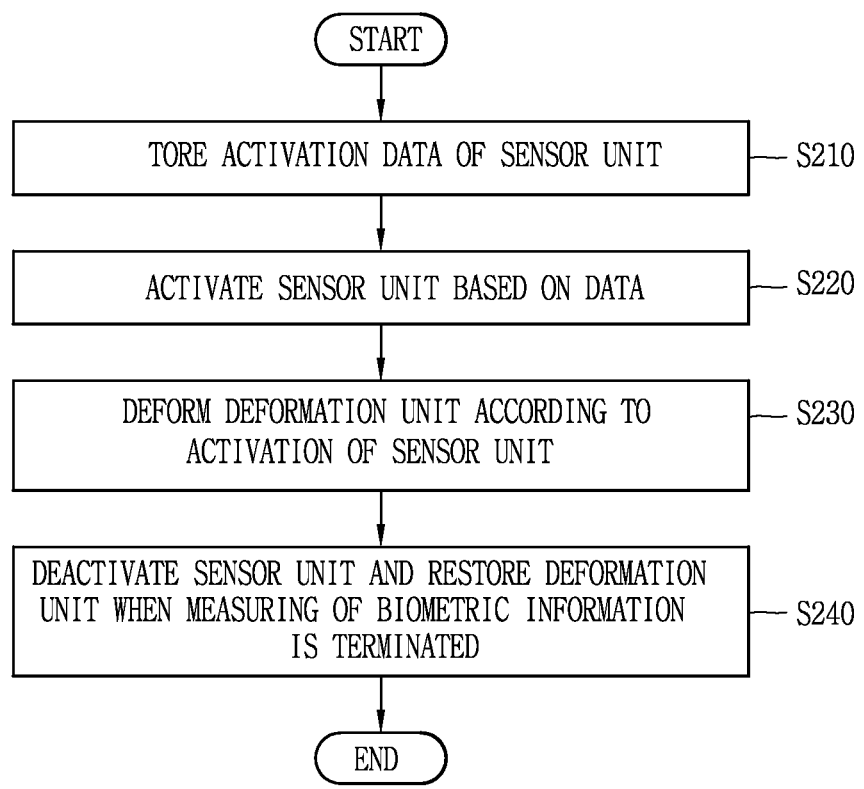
FIG. 7A is a flow chart illustrating a control method of a deformation unit.
Figure 7B:
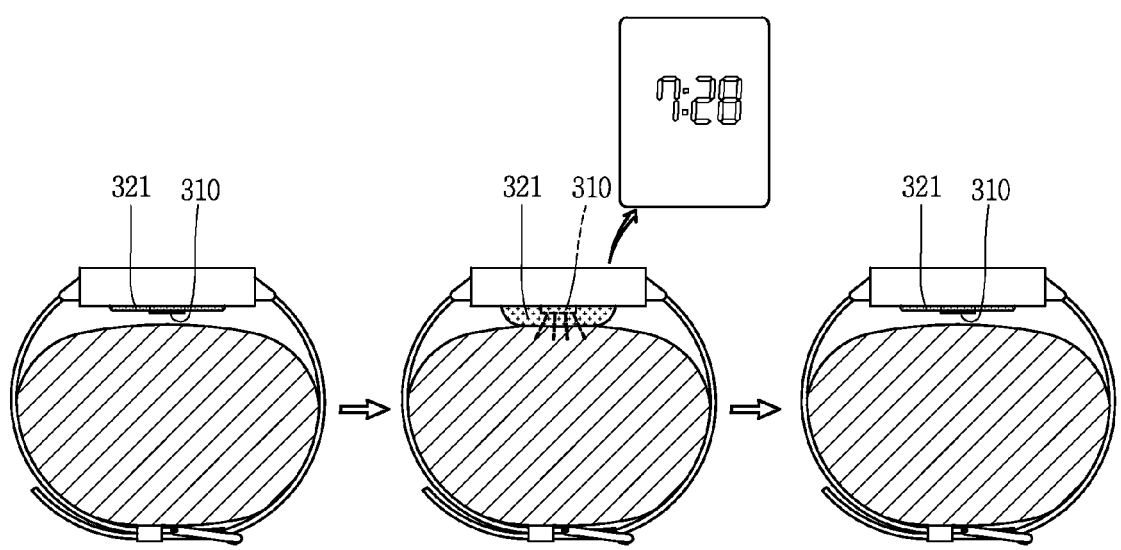
FIG. 7B is a conceptual view illustrating a control method according to an exemplary embodiment of the present disclosure.

FIG. 7A is a flow chart illustrating a control method of a deformation unit, and FIG. 7B is a conceptual view illustrating a control method according to an exemplary embodiment of the present disclosure.

The memory 170 stores activated data of the sensor unit 310 in operation s210. The control unit 180 activates the sensor unit 310 based on the data in operation S220. The control unit 180 may activate the sensor unit 310 and control the sensor unit 310 to collect biometric information.

The activation data may be formed based on a user intention or may be formed by history information collected by the memory 170. Referring to FIG. 7B, the control unit 180 may generate a particular time (7:28) as activation data. The user may set to collect biometric information at the particular time.

Or, the control unit 180 may collect information regarding a time at which the sensor unit 310 is activated by the user, and analyze the collected information to generate the activation data, and activate the sensor unit 310 even though there is no activation control command from the sensor unit 310 by the user.

The control unit 180 deforms the deformation unit 321 based on the activation of the sensor unit 310 in step S230. Namely, as the sensor unit 310 is activated, the deformation unit 321 is expanded, and thus, no matter how the watch type mobile terminal is worn on the user's wrist, biometric information may be accurately collected. Accordingly, the user does not need to memorize the necessity of collecting biometric information or does not need to adjust a wearing state of the watch type mobile terminal.

Also, when the measurement of biometric information is terminated, the control unit 180 deactivates the sensor unit 310 and restores the deformation unit simultaneously in step S240.

Figure 8A:
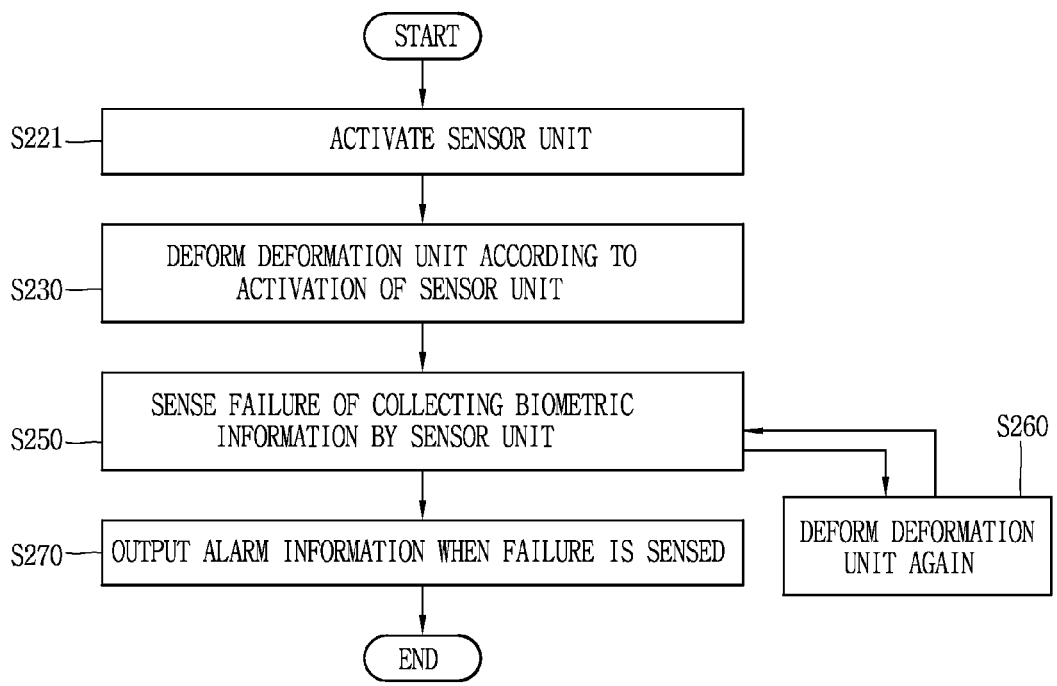
FIGS. 8A and 8B are flow charts illustrating control methods of watch type mobile terminals according to various exemplary embodiments of the present disclosure.
Figure 8B:
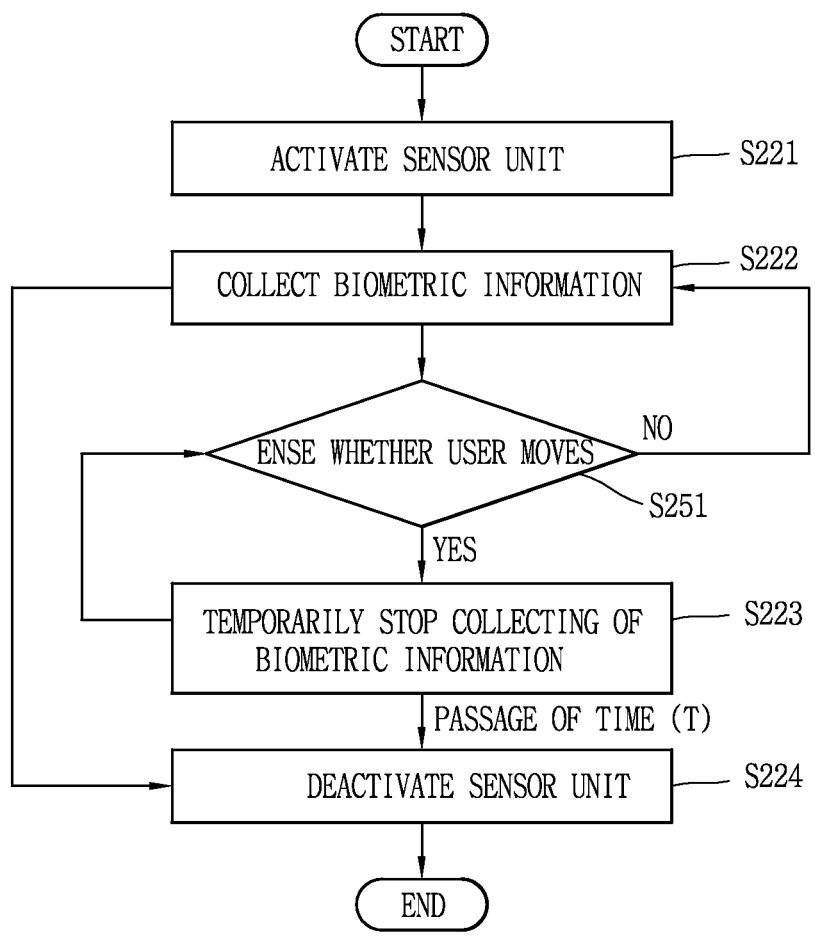

FIGS. 8A and 8B are flow charts illustrating control methods of watch type mobile terminals according to various exemplary embodiments of the present disclosure.

Referring to FIG. 8A, the control unit 180 activates the sensor unit in step S221, and deforms the deformation unit according to the activation of the sensor unit in step S230. When the sensor unit is activated, the control unit 180 senses whether collecting biometric information fails in step S250.

For example, in a case in which an amount of light collected by the light receiving unit 311 (please refer to FIGS. 4A(a) through 4C(c)) is smaller than a pre-set amount of light, or in a case in which a numerical value of light collected according to the passage of time is not within a pre-set range, and thus, light appears unstable, collecting biometric information may fail.

When it is determined that collecting of biometric information fails, the control unit 180 deforms the deformation unit again. For example, the control unit 180 may expand the deformation to be large to completely block introduced ambient light or may change a shape of a portion of a plurality of deformation units to enable the sensor unit to be positioned in a previously designated measurement region.

Or, when it is determined that collecting of biometric information fails, the control unit 180 outputs alarm information indicating the failure in step S270. For example, the notification information may include at least one of acoustic data, visual data, and vibration information. An alarm output unit outputting the alarm information may include a display unit 351, an audio output unit 352, a haptic module 153, and the like, according to types of alarm information.

For example, when collecting of the biometric information fails, the control unit 180 may control the display unit 351 to output information regarding the failure (for example, a time at which the sensor unit is activated, a cause of the failure, and the like). Also, the control unit 180 may control the memory 170 to store the visual data.

Accordingly, the control unit 180 may automatically adjust a location of the watch type mobile terminal to collect biometric information of the sensor unit without a user adjustment, whereby fine measurement position can be adjusted without user intervention. Also, when collecting of biometric information fails, the user may be immediately informed and take measures.

Referring to FIG. 8B, the control unit 180 activates the sensor unit in step S221 and collects biometric information in step S222. While the biometric information is being collected, the control unit 180 controls the sensing unit 140 to sense a movement of the user in step S251.

Here, the sensing unit 140 may be implemented as a gyro sensor, an accelerometer, and the like. When the sensing unit is activated, the control unit 180 may activate the sensing unit 140.

When a movement of the watch type mobile terminal is not sensed by the sensing unit 140, the control unit 180 maintains driving of the sensor unit.

However, when a movement of the watch type mobile terminal is sensed by the sensing unit 140, the control unit 180 controls the sensor unit to temporarily stop collecting of biometric information in step S2232. Also, when a state in which the sensor unit is temporarily stopped continues for a preset period of time t, the control unit 180 may switch the sensor unit to a deactivated state in step S224.

In the state in which the sensor unit is temporarily stopped, the control unit 180 determines whether a movement of the user is sensed. When a movement of the user is not sensed by the sensing unit 140, the control unit 180 resumes collecting of biometric information in step S222.

When collecting of biometric information is completed, the control unit 180 switches the sensor unit to a deactivated state in step S224.

According to the present exemplary embodiment, collecting of biometric information when the user moves is limited, thus minimizing noise due to a movement. Also, when the user moves continuously, it may be recognized that collecting of biometric information is not intended, and the sensor unit may be controlled accordingly.

Figure 9A:
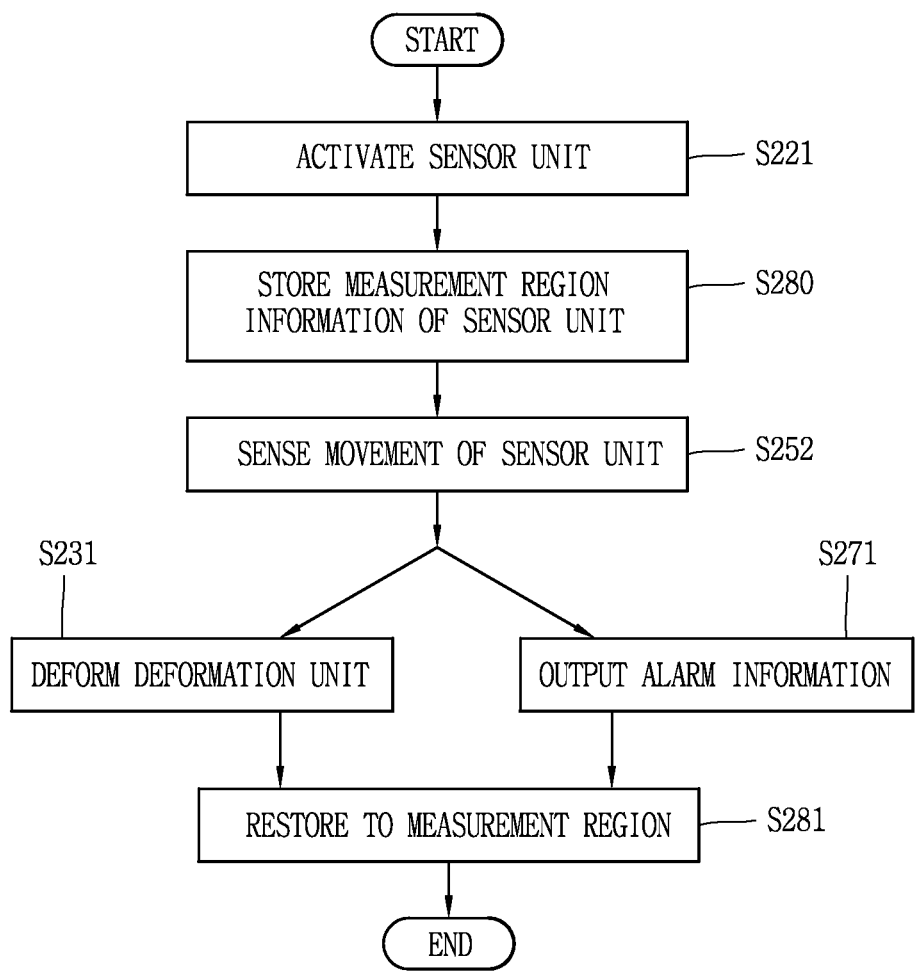
FIG. 9A is a flow chart illustrating a control method when a movement is sensed in an activated state of a sensor unit.
Figure 9B:
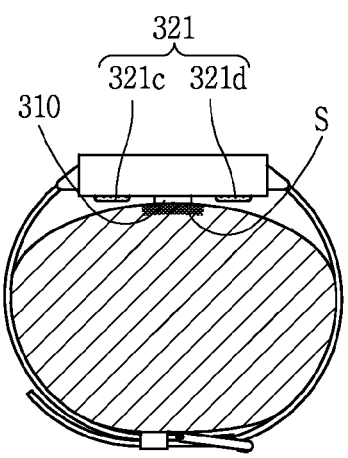
FIGS. 9B(a), 9B(b), 9B(c), 9B(d), and 9C are conceptual views illustrating the control method of FIG. 9B according to various exemplary embodiments of the present disclosure.
Figure 9B:
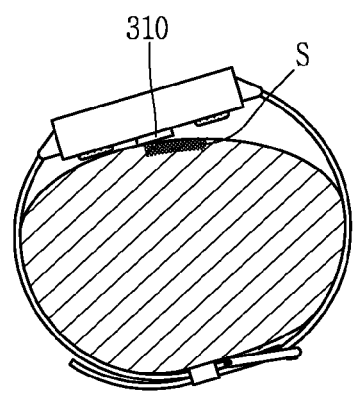
Figure 9B:
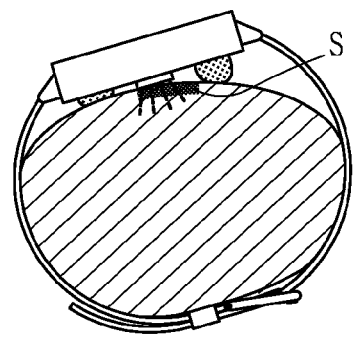
Figure 9B:
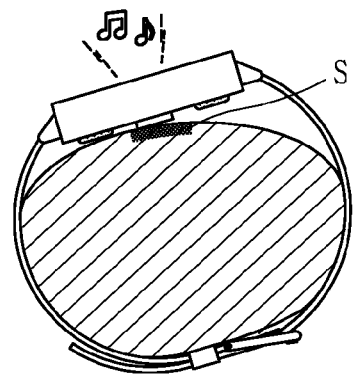

FIG. 9A is a flow chart illustrating a control method when a movement is sensed in an activated state of a sensor unit, and FIGS. 9B(a) through 9C are conceptual views illustrating the control method of FIG. 9B according to various exemplary embodiments of the present disclosure.

Referring to FIGS. 9A through 9B(d), the control unit 180 activates the sensor unit in step S221, and controls the memory 170 to store measurement region information of the sensor unit in step S280.

The measurement region S corresponds to a region of the user's wrist that light from the light emitting unit 312 reaches when the sensor unit 310 starts to perform measurement. Here, a region from which corresponding biometric information can be measured may be set as the measurement region S.

While biometric information is being collected, the control unit 180 senses a movement of the watch type mobile terminal in step S252. Referring to FIG. 9B(c), the control unit 180 deforms the deformation unit 321 based on the movement of the watch type mobile terminal in step S252. For example, the control unit 180 may restore the sensor unit such that light emitted by the light emitting unit 312 reaches the measurement region S in step S281.

Or, the control unit 180 may output alarm information based on the movement of the watch type mobile terminal in step S271. For example, the alarm information may include at least one of acoustic data, visual data, and vibration data. When the user recognizes the alarm information, the user may adjust to restore the sensor unit to the measurement region S in step S281.

Based on a degree of the movement, the control unit 180 may deform the deformation unit 321 or output the alarm information. For example, when it is determined that it is difficult to restore the sensor unit 310 to the measurement region S by the deformation unit 321, the control unit 180 may output the alarm information.

Figure 9C:
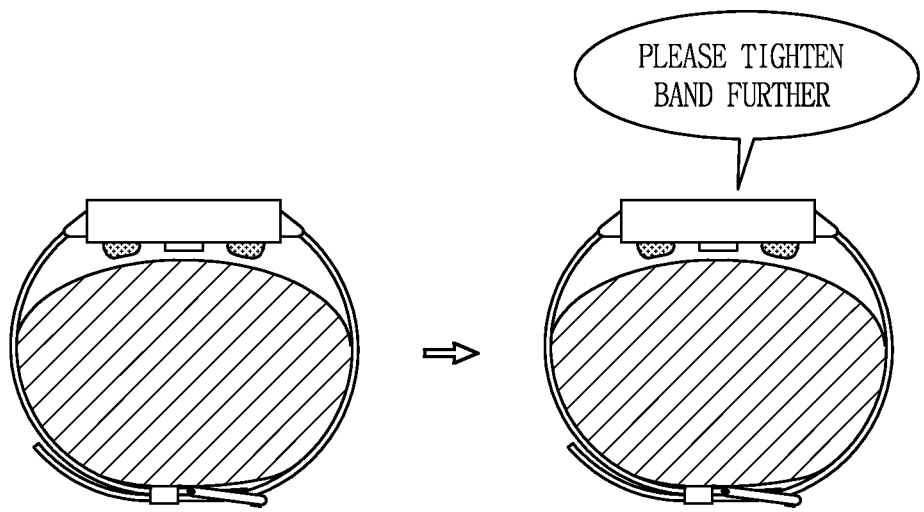

Referring to FIG. 9C, the control unit 180 may control the audio output unit 352 to output an action to be taken by the user, by voice information as alarm information. For example, the voice information may include "Please tighten the band", "Please turn the main body to the right", "Please stop moving", and the like. However, the voice information and alarm information according to the present exemplary embodiment may also be output in an activation standby state before the sensor unit is activated.

Figure 10A:
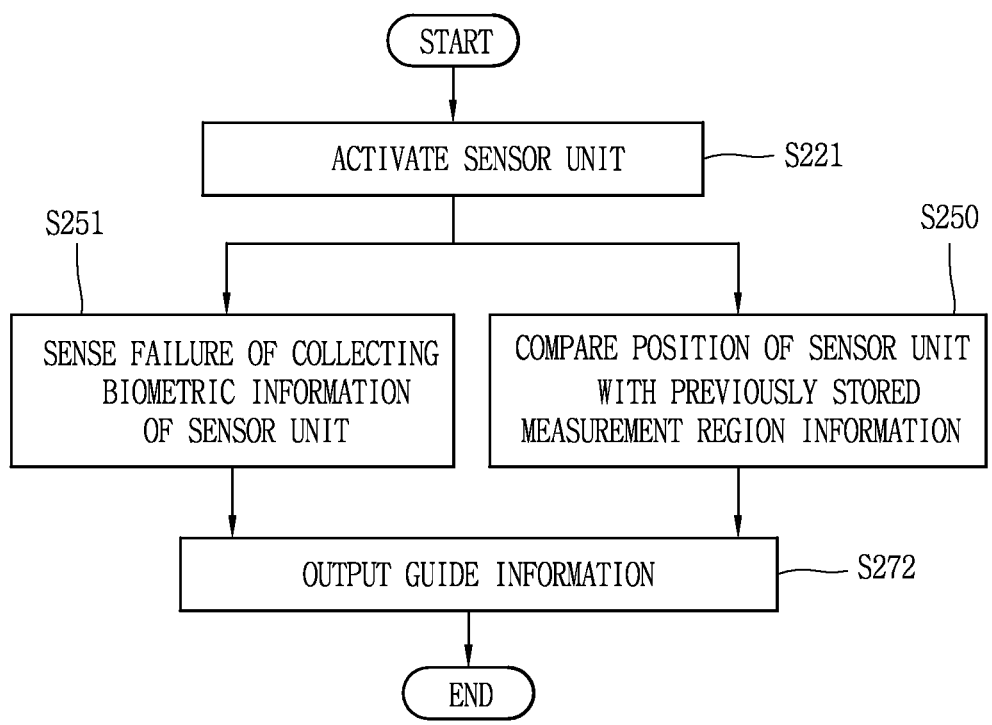
FIG. 10A is a flow chart illustrating a control method of outputting guide information for collecting biometric information.
Figure 10B:
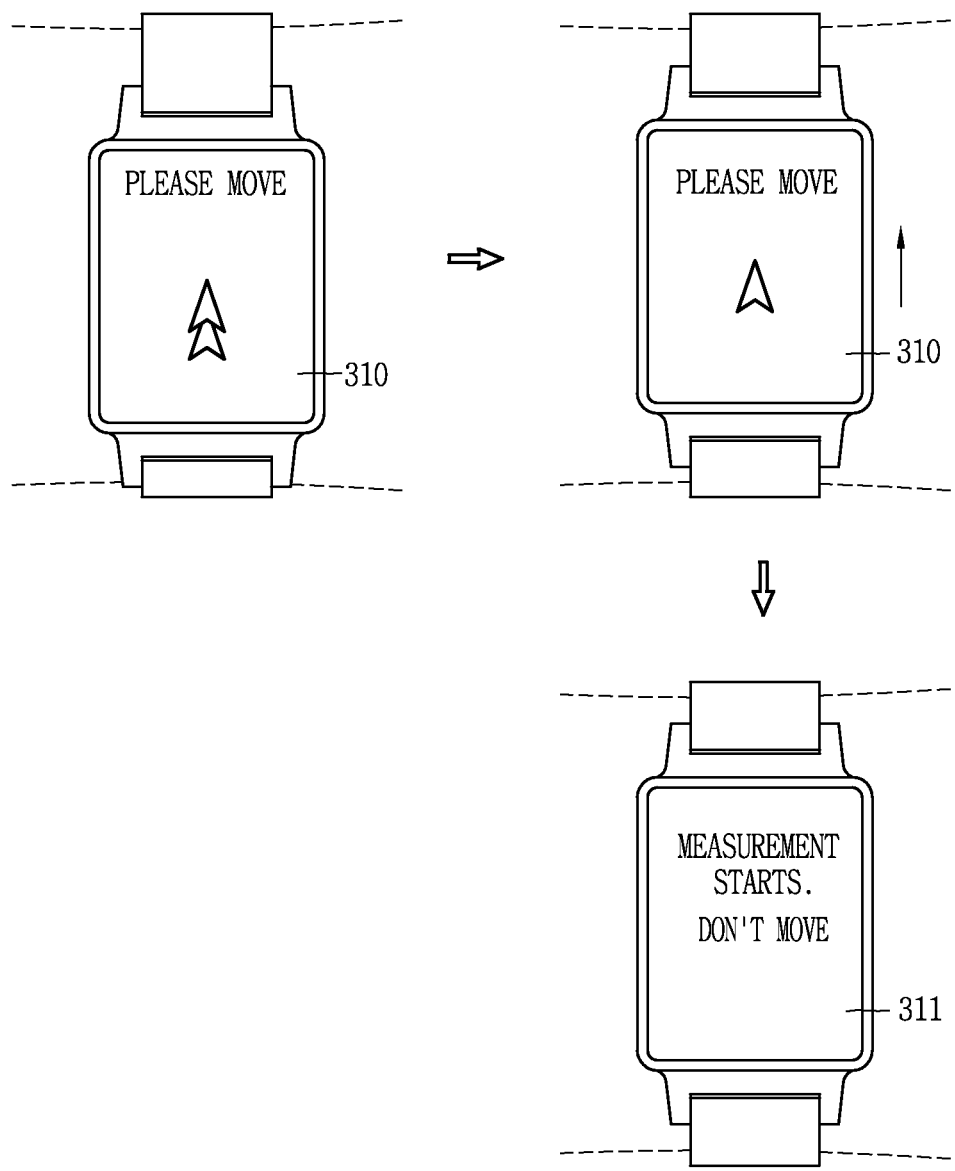
FIGS. 10B, 10C and 10D are conceptual views illustrating a control method of FIG. 10A.
Figure 10C:
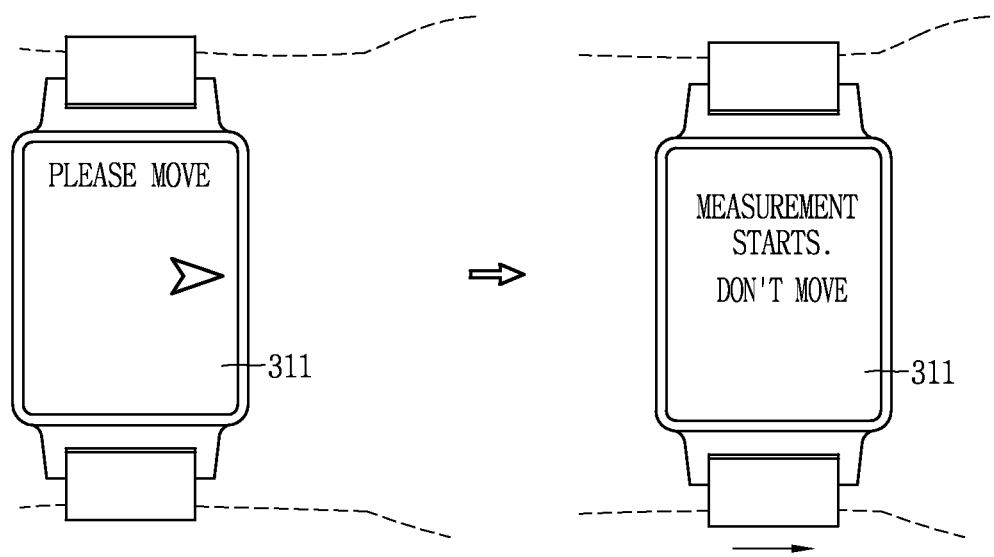
Figure 10D:
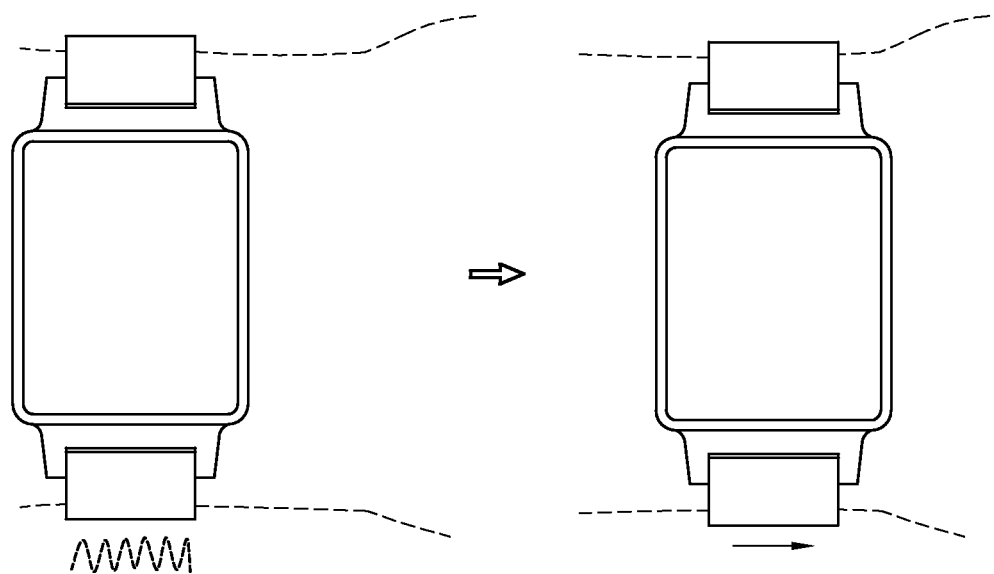

FIG. 10A is a flow chart illustrating a control method of outputting guide information for collecting biometric information, and FIGS. 10B through 10D are conceptual views illustrating a control method of FIG. 10A.

Referring to FIGS. 10A and 10B, the control unit 180 may activate the sensor unit in step S221 and collects biometric information. The control unit 180 compares a position of the sensor unit with the measurement region information previously stored in the memory 170. For example, a position of the sensor unit 310 based on the user's wrist may be sensed by the sensing unit 140, and the control unit 180 compares the position of the sensor unit 310 sensed by the sensing unit 140 with the measurement region.

When it is determined that the position information of the sensor unit is different from the measurement region, the control unit 180 may control the display unit 351 to output guide information 310. The guide information 310 may include an image indicating a direction in which the main body 301 including the sensor unit 310 installed therein is to move. For example, the image may include arrow shapes having different sizes according to degrees by which the image is to move.

The control unit 180 may sense a state in which the watch type mobile terminal is worn on the user's wrist, and control the display unit 351 to output the image based on the state of the watch type mobile terminal worn on the user's wrist. For example, the image may include an arrow indicating a direction in which the main body is to rotate on the user's wrist.

Meanwhile, in a case in which the positions of the sensor unit is substantially identical to the measurement region unit according to a movement of the watch type mobile terminal, the control unit 180 may control the display unit 351 to output measurement notification information 311 indicating starting of measurement.

Referring to FIG. 10C, the guide information 311 may include an image indicating to move to a thinner region or thicker region of the user's wrist. For example, when the measurement region is positioned in a region closer to the user's hand than the region in which the sensor unit 310 is positioned, the control unit 180 controls the display unit to output the guide information 311 including an image of an arrow indicating a direction in which the hand is positioned.

Referring to FIG. 10D, the control unit 180 may control the haptic module 153 to output the vibration data as the guide information. For example, the haptic module 153 may be disposed to be adjacent to the fastener 302a.

As vibrations are generated in the region adjacent to the fastener 302a, the user may tighten or loosen the band 302 using the fastener 302a to move the watch type mobile terminal on the wrist.

According to exemplary embodiments of the present disclosure, when the sensor unit is required to be moved, guide information including a direction of the movement is provided to allow the user to recognize the necessity of movement by intuition. Also, even in a state in which the user does not know the measurement region, the sensor unit may be quickly moved so as to be adjacent to the measurement region.

Figure 11A:
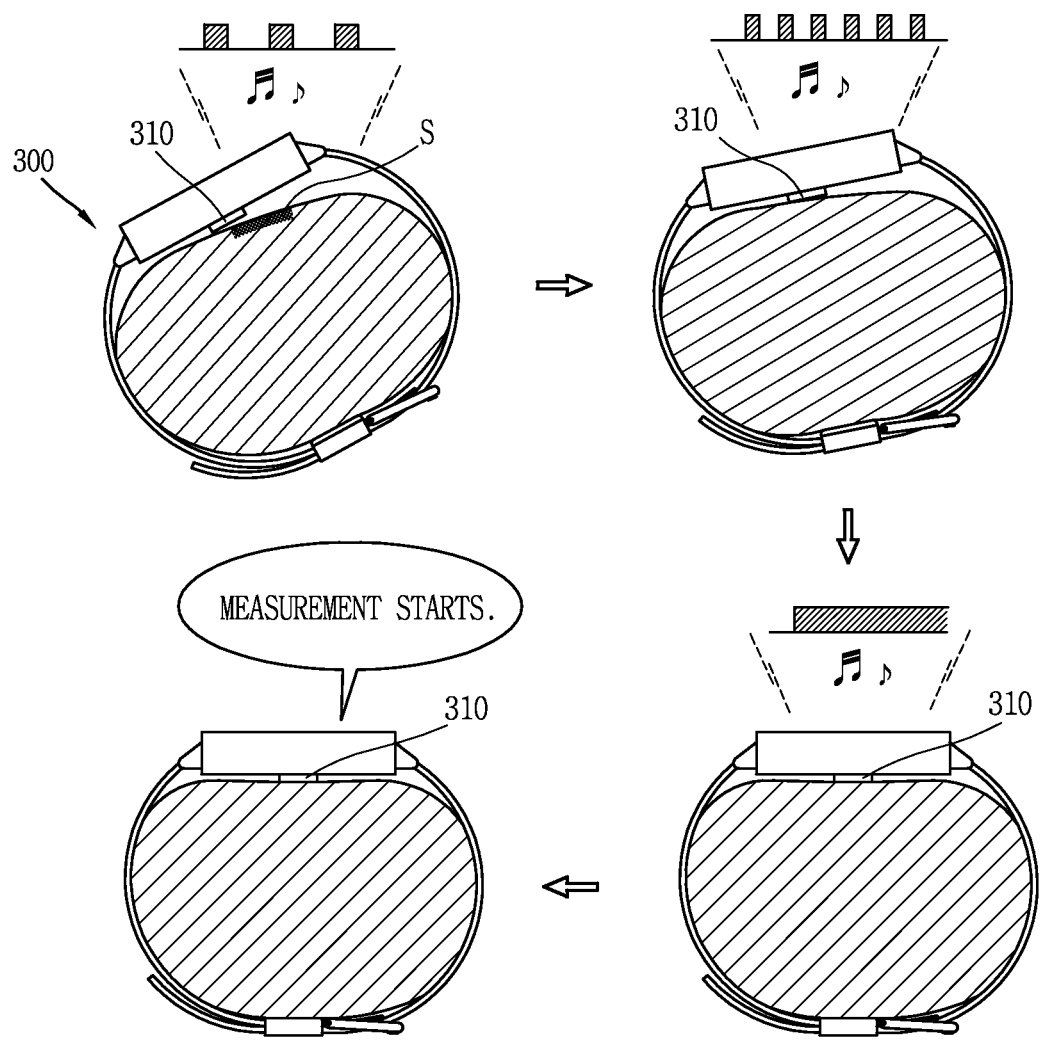
FIGS. 11A and 11B are conceptual views illustrating a control method of outputting alarm information according to adjustment of a position of a watch type mobile terminal.
Figure 11B:
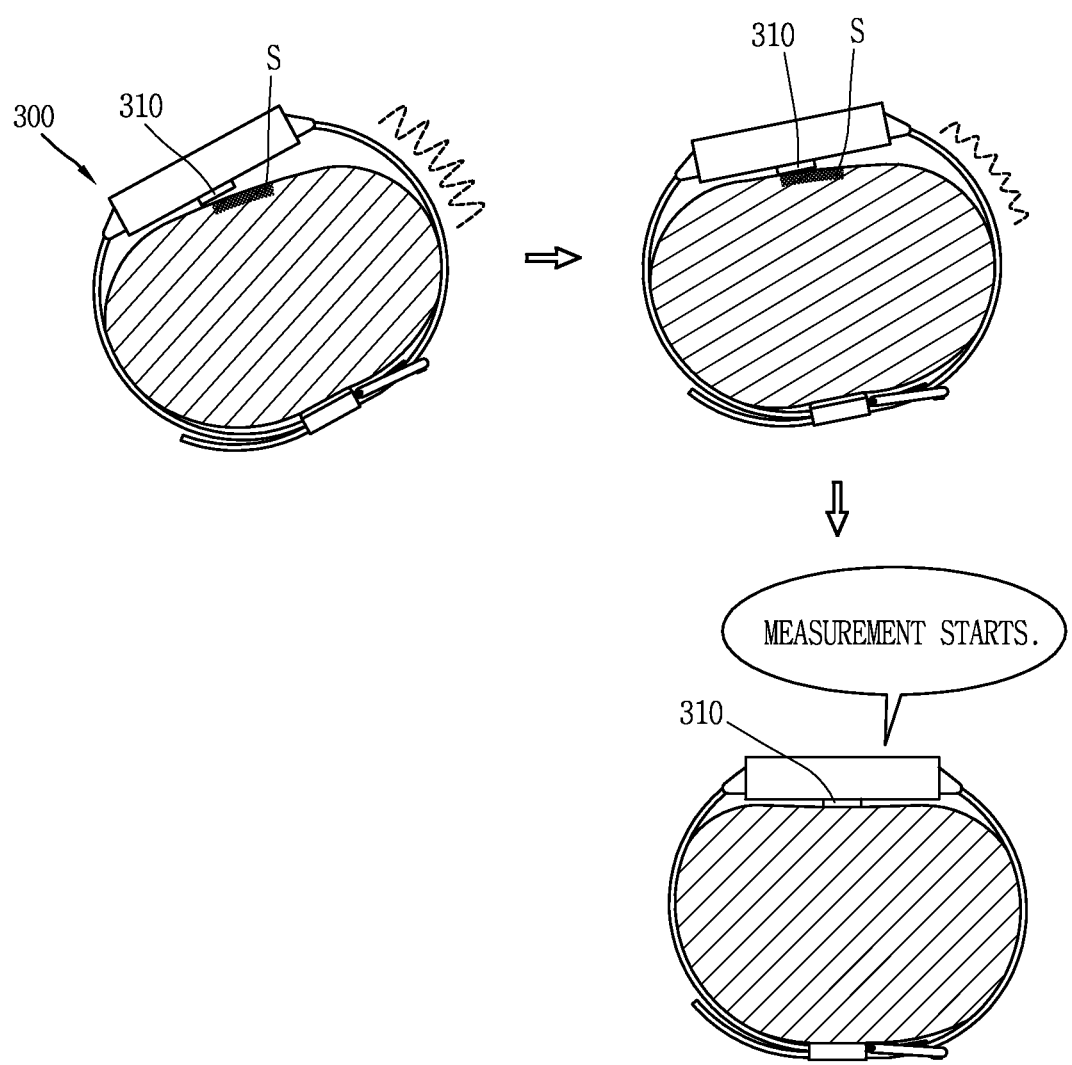

FIGS. 11A and 11B are conceptual views illustrating a control method of outputting alarm information according to adjustment of a position of a watch type mobile terminal.

Referring to FIG. 11A, when a position of the sensor unit 310 does not correspond to the measurement region, the control unit 180 may output alarm information. For example, the control unit 180 may determine whether the position of the sensor unit 310 is appropriate for collecting biometric information by using the measurement position information previously stored in the memory 170 or based on light received by the light receiving unit of the sensor unit 310.

When the position of the sensor unit 310 does not correspond to the measurement region, the control unit 180 controls the audio output unit 153 to output alarm information including first hearing data. The first hearing data may correspond to a sound repeated at preset time intervals. For example, the sound may be output twice for one second.

The control unit controls the audio output unit 352 to output second hearing data including a sound which repeatedly output at a faster rate as the sensor unit 310 becomes closer to the measurement region. For example, the sound forming the second hearing data may be set to be output five times for one second. Namely, as the sound is output at increasingly short intervals, the user may recognize that the sensor unit 310 gradually moves to the appropriate position.

When the sensor unit is positioned to correspond to the measurement region, the control unit 180 controls the audio output unit 352 to continuously output the sound. When the sensor unit 310 is positioned to correspond to the measurement region and a movement is not sensed any longer, the control unit 180 stops outputting of the sound. Also, the control unit 180 may control the audio output unit 352 to output notification information indicating that biometric information starts to be measured.

Conversely, when the sensor unit 310 moves in a direction away from the measurement region S, the control unit 180 may reduce a rate at which the sound is repeatedly output.

According to the present exemplary embodiment, the user may move the sensor unit to be positioned in the measurement region based on hearing data output from the audio output unit 352, without having to check it with his or her eyes.

Referring to FIG. 11B, the control unit 180 controls the haptic module 153 to output a vibration pattern as the notification information. The control unit 180 outputs a vibration pattern having a greater vibration number as the sensor unit 310 becomes closer to the measurement region S. Also, when the sensor unit 310 is positioned to correspond to the measurement region S and a movement of the sensor unit 310 is not sensed any longer, the control unit 180 may stop outputting of the vibration pattern and output voice information indicating that biometric information starts to be measured.

Figure 12:
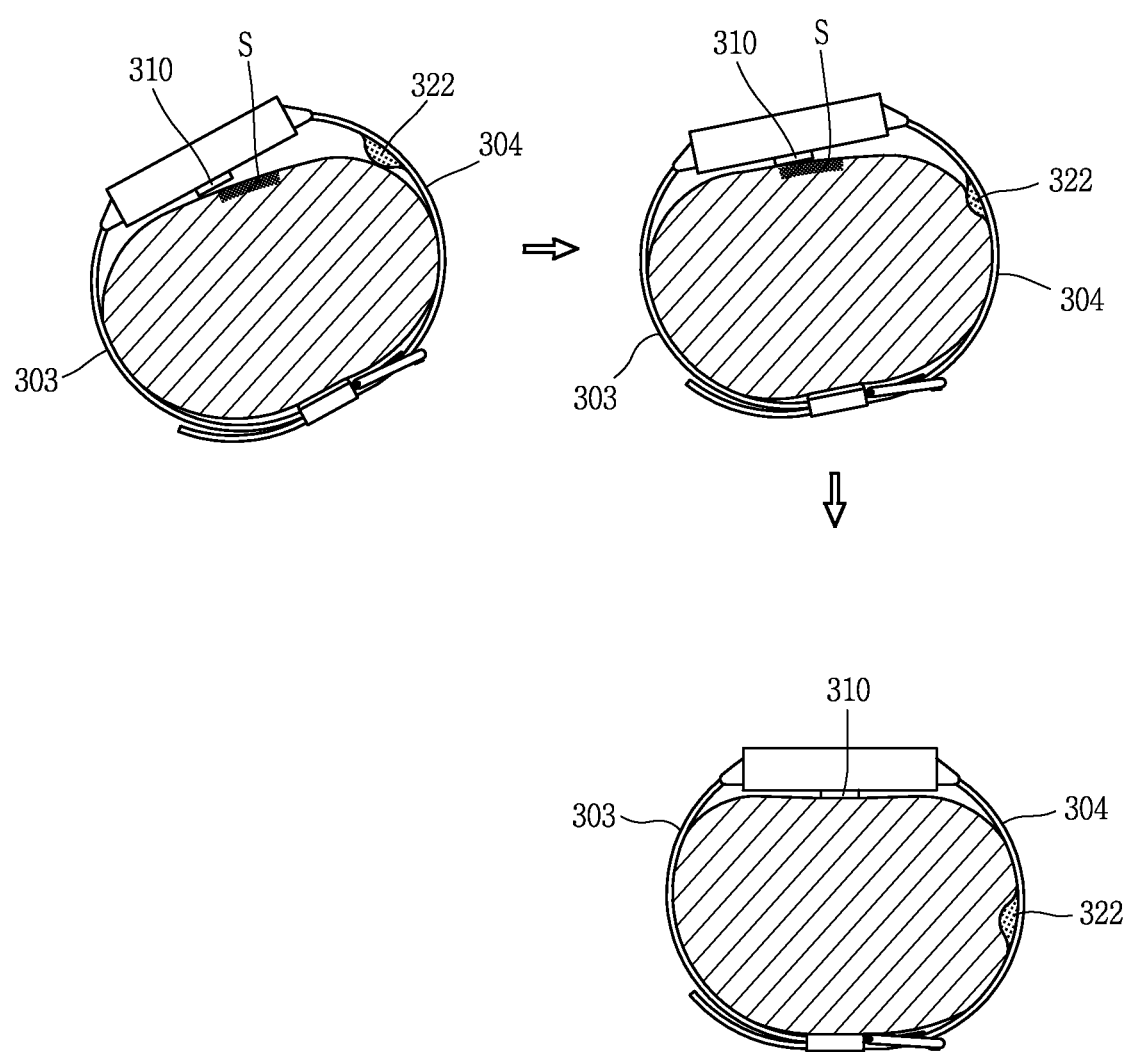
FIG. 12 is a conceptual view illustrating a control method of a deformation unit for moving a watch type mobile terminal according to an exemplary embodiment of the present disclosure.

FIG. 12 is a conceptual view illustrating a control method of a deformation unit for moving a watch type mobile terminal according to an exemplary embodiment of the present disclosure. A control method of the deformation unit 322 formed in the band unit 302 will be described with reference to FIGS. 5A and 12. The deformation unit 322 according to the present exemplary embodiment may include a plurality of deformation members having a bar shape extending along the band unit 302 or arranged along the band unit 302.

When the sensor unit 310 is positioned not to correspond to the measurement region S, the control unit 180 may deform the deformation unit 322 to rotate a watch type mobile terminal 300 on the user's wrist.

In a case in which the deformation unit 322 includes a plurality of deformation members, the control unit 180 may sequentially deform the plurality of deformation members. By deforming the deformation unit 322, the watch type mobile terminal 300 may be rotated on the user's wrist.

In a case in which the deformation unit 322 includes a plurality of deformation members, the control unit 180 may sequentially deform the plurality of deformation members. By frictional contact between the deformation members expanded in size and the skin, the watch type mobile terminal 300 may be rotated.

In a case in which the deformation unit 322 has a bar-shape extending in the direction in which the band extends, the control unit 180 may sequentially expand a partial region of the deformation unit 322 to control the watch type mobile terminal 300 to be rotated.

Accordingly, the user does not need to move the sensor unit 310 to adjust the position of the sensor unit 310 to the measurement region, and even when the sensor unit 310 finely deviates from the measurement region, the control unit 180 can collect more accurate biometric information by moving the main body. Thus, measurement quality of biometric information may be enhanced.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the control unit 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A watch type mobile terminal, comprising:
a main body;
a display coupled to the main body;
a band connected to the main body and being sized to extend about a user's wrist to permit securing of the mobile terminal to the wrist;
a first sensor coupled to the main body and including a light emitting unit and a light receiving unit, wherein the first sensor is configured to collect biometric information and provide sensor data;
a deformation element that is physically deformable in response to an input; and
a controller configured to provide the input to the deformation element to cause the deformation element to be deformed, wherein the input is based on the sensor data, and
wherein in a state in which the band forms a closed loop and is fixed to the wrist, the controller is further configured to expand the deformation element in size such that the first sensor contacts the wrist.

2. The watch type mobile terminal of claim 1, wherein the deforming of the deformation element inhibits ambient light incident to the first sensor.

3. The watch type mobile terminal of claim 2, wherein the deformation element comprises a plurality of deformation members formed to surround the first sensor; and
the controller is further configured to provide the input to the deformation element to cause at least one of the plurality of deformation members to be deformed based on an amount of light received by the light receiving unit of the first sensor.

4. The watch type mobile terminal of claim 2, wherein the deformation element comprises a plurality of deformation members disposed with the first sensor interposed therebetween, and wherein the plurality of deformation members are deformed to have different sizes such that light emitted from the light emitting unit is directed toward a particular position on the wrist.

5. The watch type mobile terminal of claim 3, further comprising:
a memory configured to store region information, wherein the region information relates to a region at which light emitted from the light emitting unit when the first sensor is activated arrives at the light receiving unit.

6. The watch type mobile terminal of claim 5, wherein the plurality of deformation members are arranged along the band, and when the first sensor experiences relative movement according to the stored region information, the controller is further configured to sequentially deform the plurality of deformation members to move the first sensor relative to the wrist.

7. The watch type mobile terminal of claim 6, further comprising:
a second sensor configured to sense movement of the first sensor unit relative to the wrist.

8. The watch type mobile terminal of claim 7, further comprising:
an alarm unit configured to output an alarm when movement of the first sensor relative to the wrist is sensed by the second sensor.

9. The watch type mobile terminal of claim 8, wherein the alarm comprises vibration,
the alarm output unit comprises a haptic module formed along the band, and
the controller is further configured to control the haptic module to output the vibration at a position adjacent to a measurement region based on the region information.

10. The watch type mobile terminal of claim 9, the controller is further configured to control the haptic module to increase strength of vibration as the first sensor becomes closer to the measurement region.

11. The watch type mobile terminal of claim 8, wherein the alarm information comprises audio, and
the alarm output unit comprises an audio output unit configured to output different audio signals according to a degree of movement of the first sensor relative to the wrist.

12. The watch type mobile terminal of claim 7, wherein when movement of the first sensor relative to the wrist is sensed by the second sensor, the control unit is further configured to deactivate the first sensor.

13. The watch type mobile terminal of claim 1, wherein the band comprises a first band connected to one end of the main body, a second band connected to the other end of the main body, and a fastener connecting the first and second bands, and wherein
the first sensor is adjacent to the main body and the deformation element is adjacent to the fastener.

14. The watch type mobile terminal of claim 1, wherein the deformation element is formed in at least one region of the band, and wherein the controller is further configured to control the deformation element to be bent such that the first sensor contacts the wrist.

15. The watch type mobile terminal of claim 1, wherein when the first sensor fails to collect the biometric information, the controller is further configured to provide the input to the deformation element to cause the deformation element to be deformed.

16. The watch type mobile terminal of claim 15, wherein when the first sensor unit fails to collect biometric information, the controller is further configured to cause the display to output guide information for guiding movement of the main body.

17. The watch type mobile terminal of claim 16, wherein when the first sensor is activated, the controller is further configured to cause the display to output notification information indicating an activated state of the first sensor.

18. The watch type mobile terminal of claim 16, wherein the guide information includes an image indicating a movement direction of the main body or the band.

19. The watch type mobile terminal of claim 15, wherein the band comprises a first band connected to one end of the main body, a second band connected to the other end of the main body, and a fastener connecting the first and second bands, and
wherein the watch type mobile terminal further comprises:
a haptic module adjacent to the fastener and configured to generate vibration when the first sensor fails to collect biometric information.

* * * * *